Feb. 1, 1944.   D. W. RUBIDGE ET AL   2,340,772
ACCUMULATING MEANS
Filed July 25, 1940   9 Sheets-Sheet 1
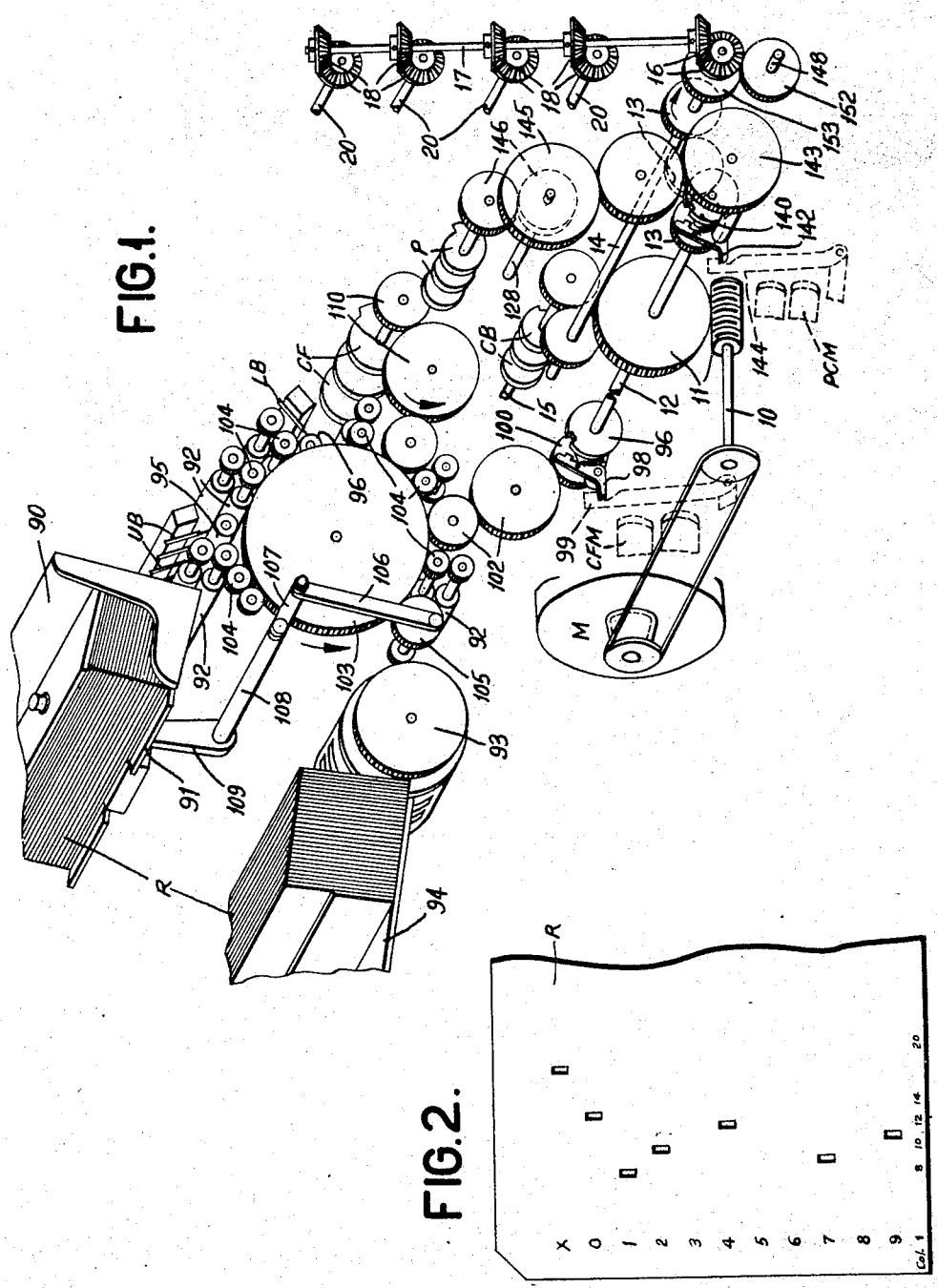
INVENTORS
D. W. Rubidge
E. J. Rabenda
W. M. Wilson
BY
ATTORNEY.

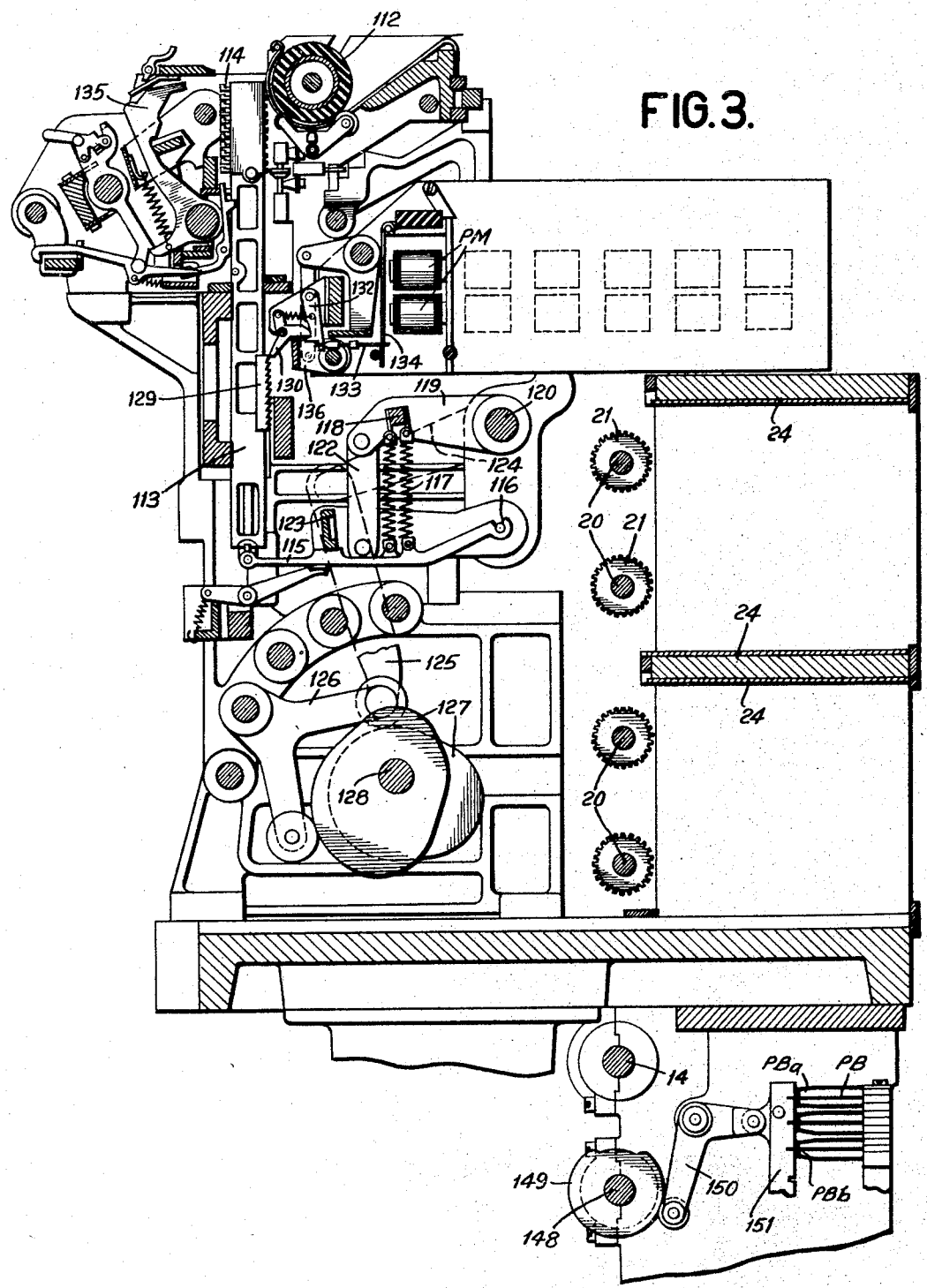

INVENTORS
D. W. Rubidge
E. J. Rabenda
W. W. Wilson
ATTORNEY

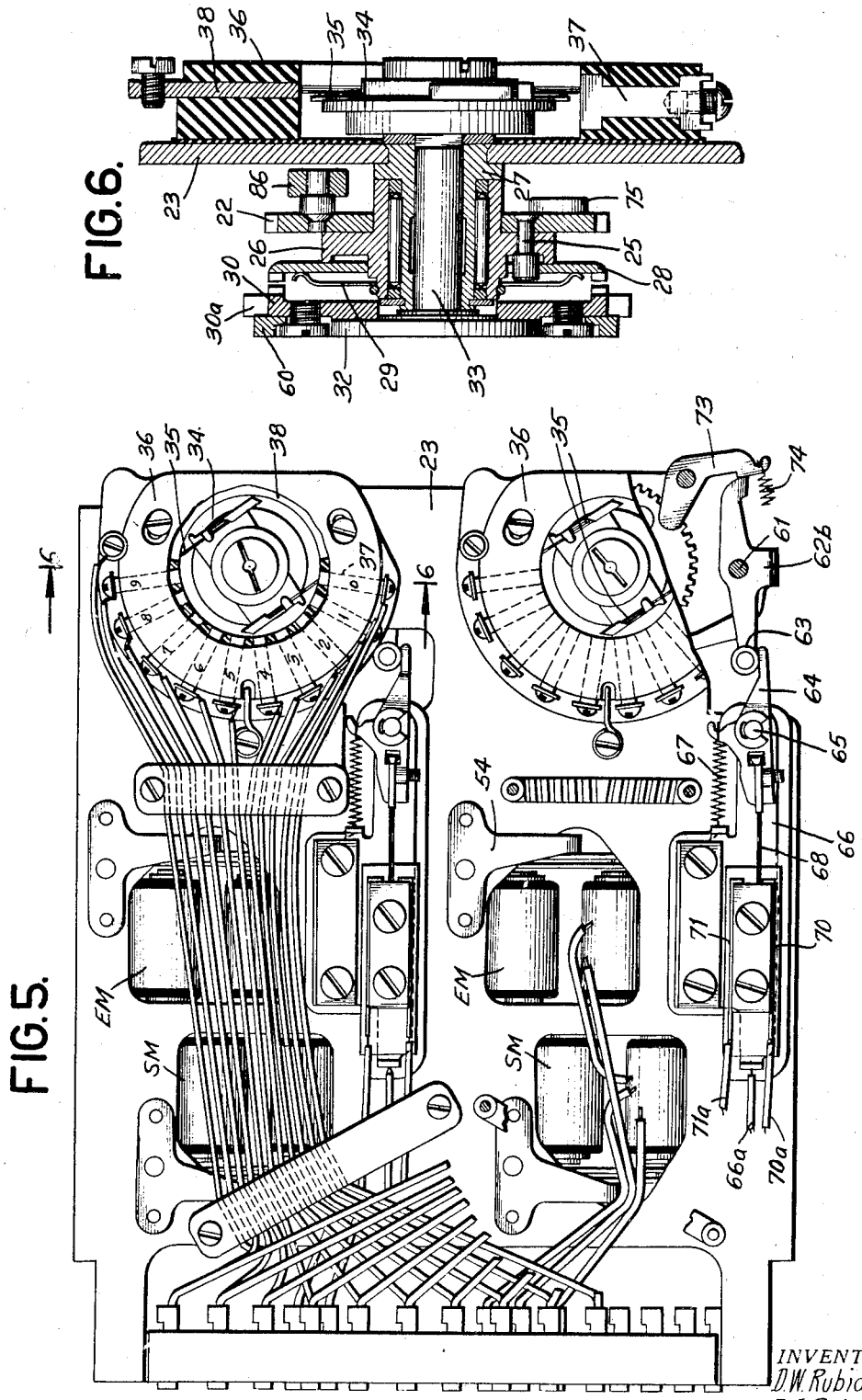

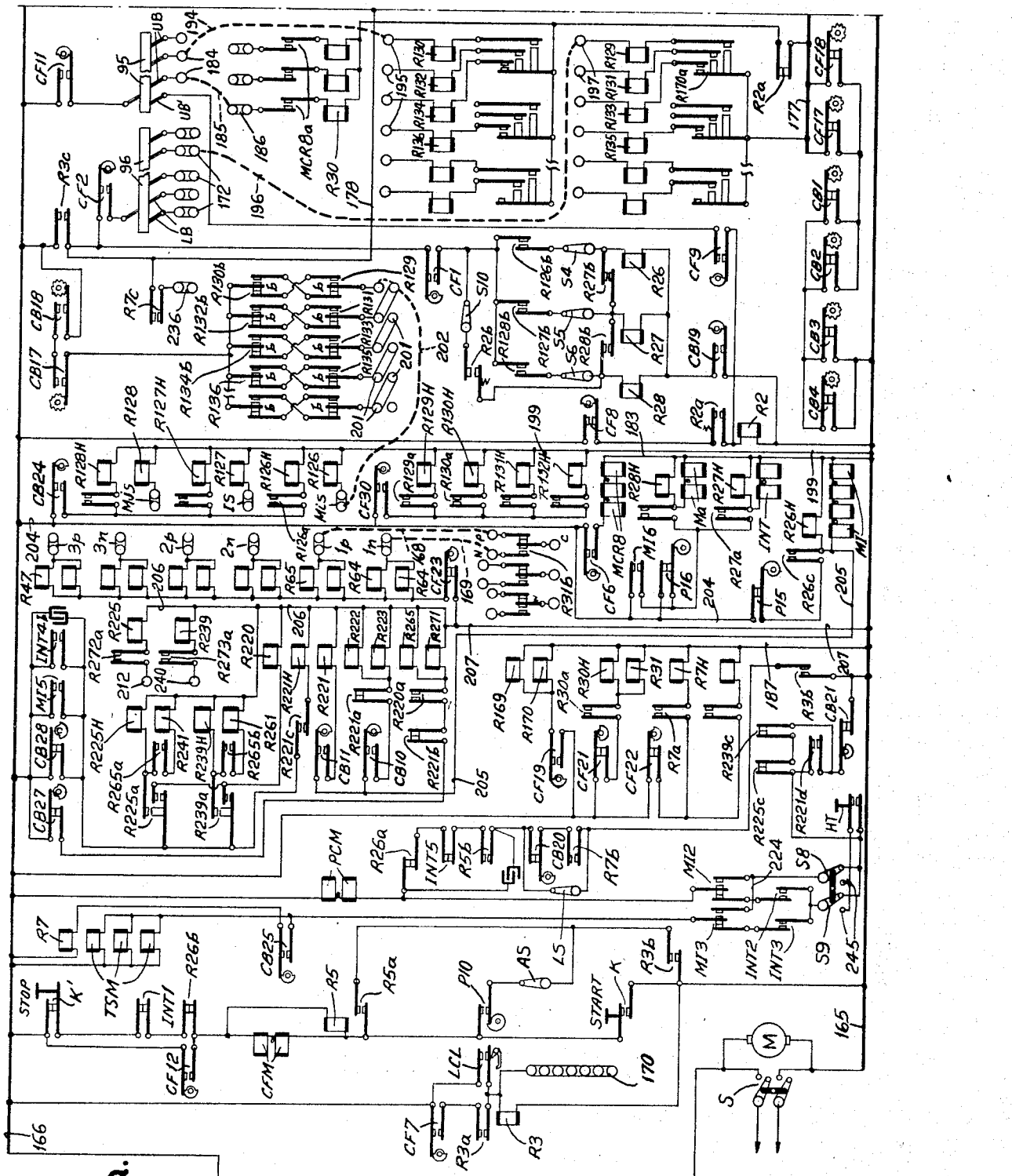

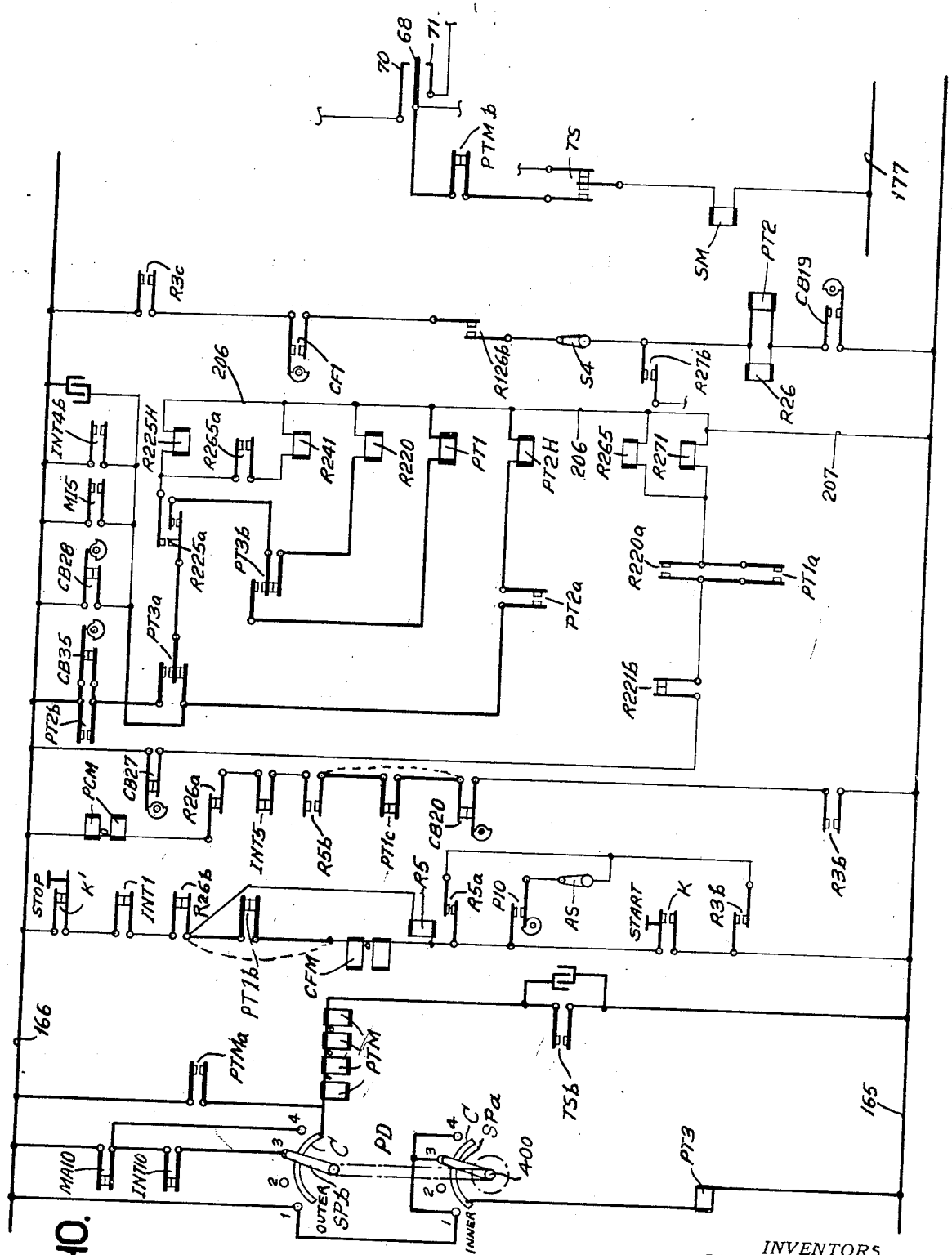

Patented Feb. 1, 1944

2,340,772

UNITED STATES PATENT OFFICE 2,340,772

ACCUMULATING MEANS

David W. Rubidge, Chatham, N. J., and Edward J. Rabenda, Binghamton, N. Y., assignors to International Business Machines Corporation, New York, N. Y., a corporation of New York Application July 25, 1940, Serial No. 347,436

12 Claims. (Cl. 235—61.8)

This case relates to accumulating and recording means of accounting machines, such, for example, as are controlled by records bearing value designations.

It is desired in accounting machines to obtain the balance of negative and positive values and to record the balance, negative or positive, in natural or true figures. In a known machine, disclosed in Patent No. 2,199,547, two accumulators are used to obtain the balance of negative and positive amounts. One of these accumulators receives positive values as true figures and negative values as "tens" complements while the other accumulator receives the negative values as true figures and the positive values as "tens" complements. Depending on whether the balance is negative or positive, one of these accumulators will register true figures and this accumulator will be selected for controlling total printing.

The general object of the present invention is to provide improved, simplified means for accumulating negative and positive amounts and obtaining the balance in true figures whether such balance be negative or positive.

More specifically, an object is to provide a single balance accumulator for receiving positive values as true figures and negative values as "nines" complements and for maintaining a negative balance of positive and negative values as a "nines" complement in each order, including the units order.

An object is, further, to provide such a single balance accumulator as will provide a correct, true registration of a positive balance of negative and positive entries.

Another object is to provide a novel method and novel means for converting a complement of a negative balance into true figures.

An object is, further, to provide a method and means of converting a complement of a negative balance into true figures by adding to each of the columns or orders of the complement registration the difference between the complement figure in each order and the corresponding true figure while carrying between the orders is suppressed or ignored.

An object is, also, to select the conversion figure, to be added to an order, under control of the order itself.

In record-controlled accounting machines, the record cards may be arranged in minor, intermediate, and major groups. Accumulators may be provided for accumulating the items from each such group. When a minor group change occurs, a total taking cycle is initiated for reading out the total of the minor group accumulator. Upon an intermediate group change, the intermediate, as well as minor group accumulator, is read out. When a major group change occurs, the major, intermediate, and minor group accumulators are read out. The cards are fed through the machine during card feed cycles and during each such cycle, the values are derived from a card and entered in the appropriate accumulators. When a group change occurs, the card feed cycles are interrupted and a total taking cycle initiated. Following the total taking cycle, the card feed cycles may be resumed.

Another object of the present invention is, upon detection of a negative balance in an accumulator from which a total is to be read out, to interpose a conversion cycle between the card feed cycle during which the group change occurred and the total taking cycle. During this conversion cycle, the negative complementary balance will be converted according to the novel method into true figures. After the conversion, the total taking cycle will be initiated to record or read out the negative balance in true figures.

It is another object of the invention to provide a conversion cycle only if the particular group change occurs which demands that the accumulator selected for accumulating amounts from the particular group which has changed has a negative balance. Thus, upon a minor group change, a conversion cycle will occur if the minor group accumulator has a negative balance. Further, upon a minor group change, if the minor group accumulator has a positive balance, a conversion cycle will not occur even though the intermediate group accumulator should have a negative registration. However, upon an intermediate group change, a conversion cycle will occur even though the intermediate group accumulator has a positive balance provided that the minor accumulator has a negative balance. Thus, the invention contemplates control and selection of conversion operations by the group or auto control means.

It is also within the purview of the invention to provide each accumulator with registering means including an amount representing commutator to select the conversion digits and control the conversion operation.

It is a further object to suppress carry operations during conversion.

In some cases, it is desired to obtain progressive totals. Ordinarily, an accumulator is zeroized when its balance is read out. In progressive totaling, the balance is read out and retained for accumulation with following amounts and balances. It is also desirable to interrupt progressive totaling by a selected accumulator upon the occurrence of a particular group change. For example, an accumulator may be selected to accumulate progressive minor totals and to be cleared when an intermediate group change occurs. According to the principles of the present invention, when the selected accumulator has a negative balance, registering as complements, the complements are converted into true figures before being read out of the accumulator. In progressive totaling, if the accumulator retained its converted true figures, the further accumulation of values would result in an incorrect balance since the accumulator will not recognize the true figures as a negative balance. Accordingly, it is an additional object of the invention, when the machine is taking progressive totals, to reconvert a converted negative balance into its previous complementary figures before further entries are made therein.

Further, it is an object to add into an accumulator order during conversion and reconversion two conversion amounts the sum of which is ten so that after reconversion, the order will contain the original complementary amount.

According to the present invention, a single balance accumulator is provided for receiving negative and positive amounts, with the negative amounts being entered as a "nines" complement in each order. The accumulator proper has a sufficient number of orders to receive the highest positive total which may be accumulated. In addition, above the highest order of the accumulator proper, a supplementary order is provided into which "9" is entered as an incident to the entry of each negative amount in complementary figures. If the supplementary order at the end of a group change registers 9, then a negative balance is standing in the accumulator. If the supplementary order registers 0, then a positive balance is indicated. Means are provided to test the supplementary order for a "9." If the test determines that the supplementary order has a "9," then negative balance control means are opertaed to initiate a conversion cycle and to cause the addition of the conversion digits. At the end of the conversion cycle, a total taking operation is initiated during which the negative balance converted into true figures is read out and recorded, preferably as a printed record identified as a negative amount by a suitable symbol. If the supplementary order is found to contain "0," manifesting the presence of a positive balance, the total taking cycle may be initiated directly after the card cycle during which a group change took place.

When the supplementary order advances from 9 to 0 because of the change from a negative to a positive balance, a carry takes effect from the supplementary order to the units order. This provides a correct registration in true figures of a positive balance. If the supplementary order moves from "9" to "9" as a result of the addition of the complement of a negative amount to a previous negative balance, a carry from the supplementary to the units order also occurs, causing the unit and higher orders to register a "nines" complement. With all the orders, including the units order, registering a "nines" complement, the conversion is simplified since it is unnecessary to distinguish the units order from the other orders as would be the case were the accumulator to receive and register "tens" complements. Further, by utilizing a "nines" complement in each order, the entry of a negative amount from the card is simplified since it is unnecessary to distinguish between the units order and the other orders as would be necessary were a "tens" complement to be entered.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is an isometric skeleton view of operating parts of the machine.

Fig. 2 shows a portion of a record card.

Fig. 3 is a vertical, side sectional view through the machine showing the printing means.

Fig. 5 is a view of the plate and accumulators taken from the opposite side.

Fig. 6 is a section along lines 6—6 of Fig. 5.

Figs. 8a and 8b show the circuits of the machine for ordinary accumulation without progressive totaling.

Fig. 10 shows additions to the circuits for progressive totaling.

Figure 4:
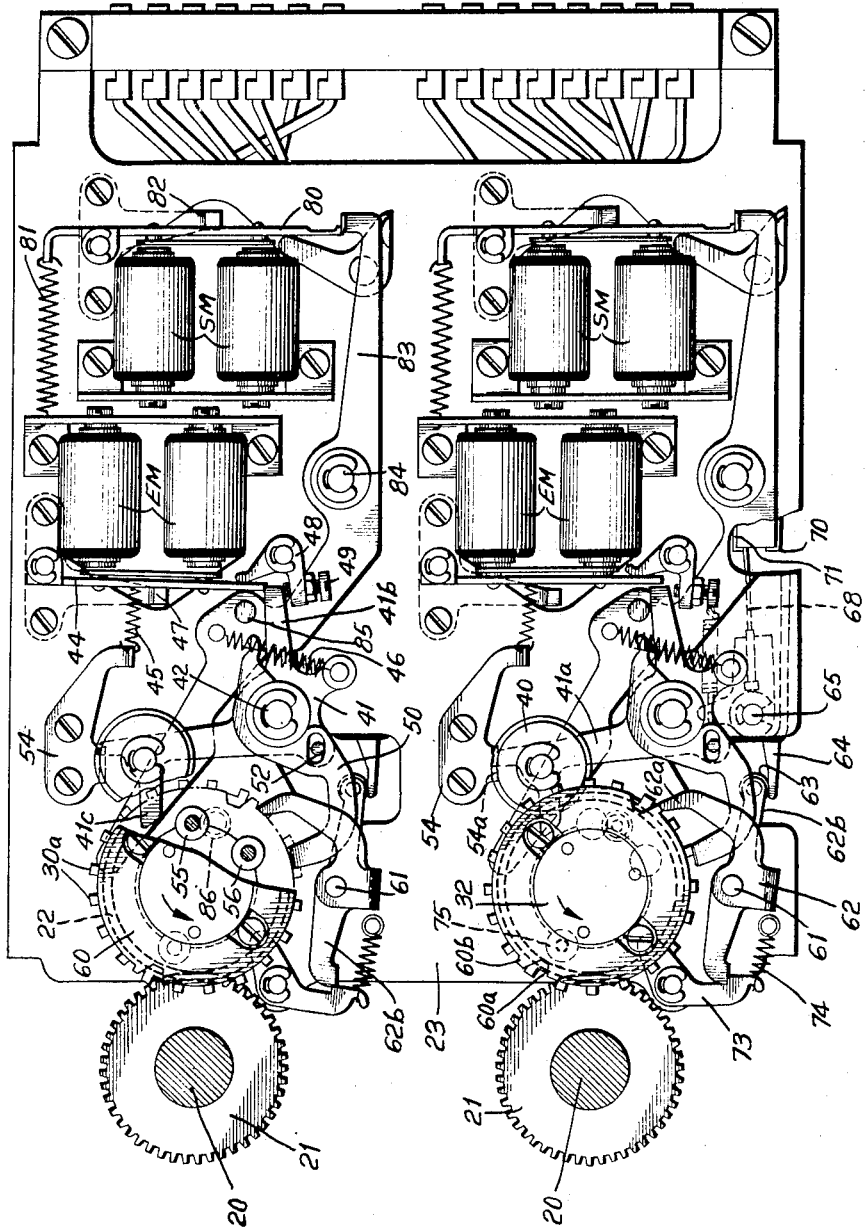
Fig. 4 is a side, partly sectional, view, of a pair of accumulator orders mounted on a single plate.

*Main drive (Fig. 1).*—A motor M has a belt and pulley drive to a shaft 10 which through worm gearing 11 rotates a main clutch shaft 12. Shaft 12 through gearing 13 rotates a shaft 14 which, in turn, is geared to a shaft 15. On shaft 15 are cams CB for operating CB cam contacts referred to later in the circuit description.

*Accumulator drive means (Figs. 1, 3, 4, and 6).*—Shaft 14 serves through bevel gears 16 to rotate a vertical shaft 17. Pairs of bevel gears 18 afford drive from shaft 17 to vertically spaced horizontal shafts 20. Each shaft 20 has spaced gears 21 for rotating gears 22 of a tier of accumulator orders. In the present machine, there are four shafts 20 and four tiers of accumulator units. Each unit may be assigned to a desired denominational order of an accumulator bank and will be referred to as an accumulator order. The accumulator orders are mounted on plates 23 slidably insertible between guide members 24 of the machine frame. The upper two tiers are conveniently carried by one set of plates 23 and the lower two tiers by another set of plates. Each individual supporting plate 23 thus carries two vertically separated accumulator orders, one from each of a pair of vertically spaced tiers. When a support plate 23 is fully inserted, the gears 22 of the two accumulator orders carried thereby move into mesh with a pair of gears 21 of two vertically separated shafts 20. The accumulator orders are alike and the details of only one will be given below.

*The accumulator order (Figs. 4, 5 and 6).*— Each gear 22 is fastened to a member 26 rotatably carried through suitable bearings by a sleeve 27 fixed to plate 23. The member 26 loosely carries a clutch disk 28. Pins 25 (only one is shown) extending transversely from member 26 pass through openings in clutch disk 28 and force the clutch disk to rotate with member 26 and gear 22 while permitting lateral movement of the clutch disk. A spring washer 29 on member 26 normally maintains the clutch disk 28 in rear, retracted position. The gear 22, member 26, and disk 28 may be referred to as the entering means of the accumulator order. When clutch disk 28 is in retracted position, its teeth are disengaged from the teeth of a clutch wheel 30 fixed to a disk 32. Disk 32 is fastened to one end of a shaft 33 journaled in the fixed sleeve 27. The parts of the accumulator order thus far described are at one side of plate 23. At the opposite side is a readout commutator comprising a plate 34 of insulating material secured to shaft 33. Plate 34 carries diametrically opposite conductive brushes 35. Fixed to plate 23 is an insulating member 36 in which is set a series of ten contact segments 37—0 to 9, disposed as shown in Fig. 5, and corresponding respectively to values 0 to 9. Set in member 36, opposite the contact segments 37, is a common contact segment 38. During one half a turn of shaft 33, one of brushes 35 successively wipes segments 37—0 to 9, while the other brush rides along common contact segment 38; during the next half turn, the positions of the brushes are reversed. Shaft 33 may assume differential value positions in each of which a brush 35 is on a segment 37, the particular value position being denoted by the particular value segment engaged with the brush. The readout commutator thus manifests or registers the value position of the accumulator order and may be referred to as the register device; the shaft 33 may be referred to as the register shaft; the readout commutator, shaft 32, and other parts carried by this shaft may be considered as a register order or as the register means of the accumulator order. The register means is differentially operated in one direction by the entry means 22—26—28 according to a digital value of a notation, in the present case according to one of values 1 to 9 of the decimal notation. The entry means is effective to operate the register means when clutch disk 28 is moved to the left (Fig. 6) to engage with clutch disk 30. The means for thus coupling the entry means and the register means together for common rotation will now be described.

*Register coupling means.*—Adjacent the rim of clutch disk 28 is the beveled rim of a roller 40 carried by an upright arm 41a of a coupling lever 41. Lever 41 is pivoted on a stud 42 extending from the support plate 23. In the normal, clockwise position of lever 41, roller 40 has no effect on the clutch disk 28 and spring washer 29 is effective to keep the clutch disk separated from clutch wheel 30. When lever 41 is rocked counterclockwise, roller 40 engages and cams the clutch disk 28 into mesh with clutch wheel 30, thereby coupling the register means to the entering means. The coupling action of lever 41 is effected upon energization of a double coil entry magnet EM mounted on support plate 23. When this magnet is energized it attracts an armature lever 44 against resistance of a spring 45. The armature lever then releases lever 41 for counterclockwise, coupling action under the influence of a spring 46. Previous to energization of magnet EM, the spring 45 holds armature lever 44 in retracted position against a limit stop 47. In the retracted position of armature lever 44, its tip is resting on the upper edge of the rear end of a horizontal arm 41b of lever 41, thereby latching this lever in normal, clockwise position in which the register means is uncoupled from the entering means. To insure positive relation of movement of lever 41 to armature lever 44, an interposer lever 48 is provided. The lever 48 has a screw 49 adjustable to engage the lower edge of the rear end of horizontal lever arm 41b when the latter is under the tip of the armature lever. The interposer 48 has a vertical arm abutting the back of the armature lever. When the armature lever is attracted, it rocks the interposer lever 48 clockwise to kick the clutching lever 41 quickly away from latched position. On the other hand, when the clutching lever 41 is returned clockwise, it rocks the interposer lever 48 counterclockwise to return the armature lever 44 positively to latching relation with the clutching lever.

When the clutching lever 41 is in normal, latched position and the entering and register means are uncoupled from each other, the register means is positively locked in one of its value positions. The locking means comprises a detent arm 50 the free end of which is adapted to engage between peripheral teeth 30a of clutch wheel 30. The clutch wheel has twenty teeth 30a spaced apart the equivalent of a value step of the register means. The diametrically opposite teeth 30a of the clutch wheel relate to the same digital value. Thus, the teeth on one half of the wheel 30 correspond to values 0 to 9 and pass the free end of detent arm 50 as one of the brushes 35 traverses the segments 37—0 to 9 of the readout commutator. The teeth on the other half of the wheel also correspond to values 0 to 9 and traverse the free end of arm 50 as the other brush 35 is wiping the segments 37—0 to 9 of the readout commutator. Hence, each position of the register means in which detent arm 50 is between a pair of teeth 30a corresponds to a digital value 0 to 9. Arm 50 is connected to clutching lever 41 for common movement therewith by a loose pin and slot connection 52. A spring 53 between the detent arm and clutching lever takes up the play in the pin and slot connection so that, in effect, the detent arm is a part of the clutching lever. When the clutching lever is at its clockwise limit, in which it is latched up by armature lever 44 and in which the register means and entry means are uncoupled from each other, then the detent arm is engaged between a pair of teeth 30a of wheel 30 and is locking the register means in a particular value position. When the armature lever 44 releases clutching lever 41, it rocks counterclockwise to cause the register means and entry means to be coupled for common rotation and, at the same time, the detent arm 50 withdraws from the teeth 30a of wheel 30 to permit the register means to rotate. When the clutching lever is returned to its clockwise, latched, uncoupling position, detent arm 50 enters the space between a pair of teeth 30a and locks the register means in the new value position to which it has been rotated. The clutching lever is permitted by the loose pin and slot connections 52 and spring 53 to have a slight over-throw relative to the detent lever in a clockwise direction, without imposing undue stress on the locking arm 50 after it has already engaged the wheel 30 and locked the register means in position.

The counterclockwise, coupling movement of the clutching lever 41 is limited by engagement of a vertical extension of its arm 41a with a stop lug 54a of an element 54 secured to plate 23. The element 54 incidentally serves to support one end of the spring 45 which is connected at the other end to armature lever 44.

The clutching lever may be returned to clockwise, uncoupling, and relatched position by a camming roller 55 carried by member 26 of the entering means. When the clutching lever is in counterclockwise, coupling position, a horizontal extension 41c thereof is in the path of camming roller 55. When roller 55 rides past the extension 41c, it rocks the clutching lever clockwise, returning it to uncoupling, relatched position. Following the camming roller 55 is a second camming roller 56 carried by member 26. After roller 55 has restored clutching lever 41, the lever may be released by energization of magnet EM to effect a carry operation of the register means. The carry operation is terminated by the action of roller 56 on extension 41c of lever 41 after unity has been entered in the register means. The means for controlling a carry operation will now be explained.

*Carry control means (Figs. 4 and 5).*—In an accumulator bank made up of a plurality of register orders, when one order passes from 9 to or past 0 position, unity must be carried to the next higher order. In the present case, for a purpose which will be made clear later, a carry also takes place from the highest to the lowest order of the accumulator bank when the highest order passes through 0 position. Moreover, if an accumulator order, previous to carrying of unity thereto, is in a 9 value position, the carry operation will move this accumulator order to 0 position and, as a result, unity must be carried further to the next order in the succession. The carry of unity from one order to another as a result of the first order passing from 9 to or through 0 may be considered as the short carry; the further carry to still another order because of the preceding order in the succession having been caused by a carry to move from 9 to 0 may be referred to as the long carry. The carry control comprises a carry cam 60 fixed to the outer face of clutch wheel 30 of the register means of an order. The cam 60 has diametrically opposite notches 60a, each corresponding to a 9 value position of the register means. Each notch directly precedes a projection 60b which comes into action as the register means moves from the 9 to or through the 0 position. Mounted on a shaft 61 is a bail 62, one side of which is formed as a follower 62a for the carry cam 60 and the other side of which is formed as a lever 62b. The right end of lever 62b (as viewed in Fig. 4) carries an insulating roller 63 resting on one end of a pivoted brush carrier 64 of conductive material. The brush carrier is pivoted on a stud 65 carried by a brass plate 66 fastened through insulation to the support plate 23. A spring 67 urges brush carrier 64 counterclockwise (as viewed in Fig. 5), thereby influencing bail 62 clockwise. Referring to the back view, Fig. 5, brush carrier 64 carries a conductive brush 68 movable between a pair of contact ends of lower and upper conductive strips 70 and 71. These strips are fastened through insulation to brass plate 66. Leads 70a and 71a are provided from the conductive strips 70 and 71 to terminal points. Brush carrier 64 is in contact with brass plate 66 and its brush 68, therefore, is conductively connected to the brass plate. A lead 66a is provided from brass plate 66 to a terminal point. The left end of lever 62b (as viewed in Fig. 4) is adapted to coact with the lower, hook end of a latch lever 73 urged by a spring 74 into latching position. The upper end of latch lever 73 is in the path of travel of a stud 75 carried by continually rotating gear 22.

When the follower 62a is on a circular portion of carry cam 60, lever 62b and brush carrier 64 are in neutral positions in which the brush 68 is mid-way between and disengaged from both contacts 70 and 71. In the neutral position of lever 62b, its left end is abutting the front of the hook end of latch lever 73 and is unlatched, being free to move up or down. When the register means takes a 9 value position, a notch 60a of cam 60 is over the free end of follower 62a, permitting bail 62 to rock counterclockwise and brush carrier 64 to rock clockwise (as viewed in Fig. 4) under the influence of spring 67. In the clockwise position of carrier 64, its brush 68 is engaging the lower contact 70 for controlling a long carry should the register remain at 9 value position at the end of the differential value entry period. However, as soon as the register means moves from 9 value position to or past the 0 value position, follower 62a is rocked out of notch 60a and cammed clockwise (Fig. 4) beyond neutral position to an extent sufficient to cause the left end of lever 62b to move above the shoulder of the hook end of latch lever 73. The spring 74 immediately swings latch lever 73 counterclockwise (Fig. 4) to latch bail 62 in its clockwise position. With bail 62 in this position, brush carrier is in extreme counterclockwise position (Fig. 4) in which brush 68 is engaging the upper contact 71 to control a short carry operation. Should the register means advance beyond 0 position, the parts 62 and 64—68 all will remain in short carry position owing to lever 62b being latched by latch lever 73. After the carry operation has been completed, stud 75 engages the upper arm of latch lever 73 and rocks it clockwise to unhook lever 62b. Bail 62 and brush carrier 64 may then return to neutral position.

*The cycle (Fig. 9).*—At this point, a brief explanation of the cycle will be given. For convenience, the cycle is divided into twenty intervals, each covering 18°. During the first interval, a 9 value may be selected for entry, during the second interval an 8 digit may be selected, and so on to the ninth interval in which a 1 digit may be selected. A 0 value selection has no effect on the register means and only the significant values need be considered in connection with the entry operations. The teeth of clutch disks 28 and 30 are so related in position that when a perforation is sensed during an interval, a tooth of disk 28 will pick up a tooth of disk 30 about one interval later to start rotating the register order. Thus, sensing of a 9 perforation starts rotation of the register during the second interval. The entering means 22—26—28 makes one revolution each cycle and each rotational position of the entering means may be referred to a particular cycle interval. The camming roller 55 of the entering means acts during the eleventh interval to restore the clutching lever and cause the register means to stop rotating. All the carry operations are preferably initiated during the thirteenth cycle interval and camming roller 56 restores the clutch lever to interrupt carry operation during the fourteenth interval after a carry rotation of the register means is effected through one interval, sufficient to enter unity. The stud 75 of the entering means acts on latch lever 73 to release a latched carry control bail 62 after the carry step has been started.

*Adding and subtracting.*—The accumulator banks may add and subtract values. The addition of a value may be considered as a positive entry or as the entry of a true or natural number. The subtraction of a value may be considered as a negative entry which is effected by entering the nines complement of the number. In making a positive entry, the entry magnet EM is energized at about the middle of any of the first nine cycle intervals according to whether the positive number selected for entry is digit 9, 8, 7, 6 ... 2, or 1. The energization of magnet EM then releases clutching lever 41 to cause rotation of the register means to add the selected positive number. The rotation of the register means for entering the positive number is interrupted at about the middle of the eleventh cycle interval by the action of camming roller 55 on the clutching lever. To effect a negative entry, the entry magnet EM is always energized in the first or "9" digit interval clutching in the register means to start rotating during the second interval as though to enter the positive digit 9. The rotation of the register means in making a negative entry is interrupted as a result of the sensing of the negative value perforation during any of the first nine cycle intervals. The extent of rotation of the register means is then the difference between "9" and the selected negative number. For example, if the selected negative number is 9, the register means will not have been rotated at all, which may be considered as a 0 entry. If the selected negative number is 8, the register means start rotating in the second interval and its rotation will be stopped in the third interval, due to sensing of the negative perforation in the second interval. Consequently, the nines complement "1" of negative digit 8 will have been entered. If the negative number is 0, the register means will start rotating in the second interval and stop rotating in the eleventh interval and the complement of "9" of the negative digit 0 will have been entered.

The means for interrupting rotation of the register means in making a negative entry or after it has entered the nines complement of a negative number includes a subtracting magnet SM in each order. The magnet SM is mounted on support plate 23 (see Figs. 4 and 5). The armature lever 80 of magnet SM is normally held by a spring 81 in retracted position against a stop 82. In this retracted position, the tip of the armature lever is resting on the right hand end (Fig. 4) of a lever 83 pivoted on a stud 84 extending from support plate 23. To the left arm of lever 83 is connected the upper end of previously mentioned spring 46 which is connected at the lower end to clutching lever 41. Spring 46 is constantly in tension and urging clutching lever 41 counterclockwise and lever 83 counterclockwise (Fig. 4). The left arm of lever 83 is provided with a stud 85 spaced above the upper edge of right hand arm 41b of clutching lever 41 while the clutching lever is in clockwise, latched position. When the clutching lever is released by armature lever 44 of entry magnet EM, it rocks counterclockwise to effect coupling of the register means to the entering means. As the clutching lever takes its counterclockwise position, arm 41b thereof moves upwardly almost in engagement with stud 85 of lever 83. Should subtract magnet SM now be energized, its armature lever 80 will be attracted, releasing lever 83 which will be rocked counterclockwise by spring 46. As lever 83 rocks counterclockwise, its stud 85 acts on arm 41b to actuate the clutching lever 41 clockwise, returning the clutching lever to relatched, uncoupling position. Thus, energization of magnet SM results in interrupting rotation of the register means when entry of the nines complement of a negative number has taken place. The lever 83 is restored clockwise to relatched position with respect to armature 80 of magnet SM by the action of a camming roller 86 (Figs. 4 and 6) carried by the gear 22 of the entering means. Within the eleventh cycle interval, roller 86 rides past the left end of lever 83 and cams the lever clockwise to restore it to normal, relatched position.

*The record card (Fig. 2).*—In the present case, the values entered in the accumulators are derived from record cards R. A portion of one card is shown in Fig. 2. Each card has parallel columns of index positions. The first ten index positions of a column are, in ascending order, the 9 to 0 index positions. A single perforation in a column in one of the 9 to 0 positions denotes the digital value corresponding to the positions; e. g., a perforation in the 5 position represents digit 5. The digital perforation in a column may represent either a negative or positive number. No significance is to be attached to the terms negative and positive other than the fact that the number which is to be entered additively as a natural number is conveniently designated as a positive number, while a number which is to be entered subtractively is conveniently referred to as a negative number. To distinguish a positive from a negative number representation, a classifying perforation is punched for one of these classes of numbers in an index position above the 0 position in any selected column. For purposes of the present disclosure, the classifying perforation accompanies the negative value representation and is punched in the 11 or X index position, which is one position above the 0 position. A plurality of columns may be grouped to provide a numerical card field in which each column has a particular denominational order significance.

As usual, group identifying values may be perforated in the cards to identify a common group of cards. The cards may be arranged in major, intermediate, and minor groups. The major group has a common major identification and includes a plurality of intermediate groups. Each intermediate group has a common intermediate identification and includes a plurality of minor groups. Each minor group has a minor identification and is the final subdivision into which the cards are grouped.

*The card handling and analyzing section.*— One or more card groups may be collected in a single stack which is placed in supply hopper 90 (Fig. 1). A picker 91 feeds one card at a time from the bottom of the hopper to the first pair of a plurality of successive pairs of feed rolls 92. The feed rolls feed the card continuously through an upper analyzing station and one cycle later through a lower analyzing station and then to an ejecting drum 93 which deposits the card in a delivery magazine 94. The upper analyzing station comprises a common contact roller 95 and a row of conductive sensing brushes UB. The lower analyzing station has a similar contact roller 96 and a similar row of brushes LB. Each brush is adapted to sense one card column and to engage through a perforation in the column with the common contact roller. The rate of movement of the card is such that the index positions 9 to 0 and X traverse an analyzing station during the first eleven intervals of a cycle (see Fig. 9) and the portion of each interval in which a brush LB or UB engages in a perforation in an index position is indicated by the first line of the timing chart. The cards follow each other at a distance and successive cards traverse an analyzing station during successive cycles. The upper and lower analyzing stations are so spaced that corresponding index positions of a pair of successive cards are at the brushes UB and LB simultaneously.

The card feed means is driven from the continually rotating shaft 12 through releasable clutch means. Referring to Fig. 1, shaft 12 has a driving clutch disk 96 provided with a single notch. Rotatably carried by shaft 12 is a driven clutch assembly including a clutch dog 98 the tooth on which is adapted to enter the notch of disk 96 to couple the driven clutch assembly to the shaft 12 for rotation. The tail of clutch dog 98 is initially latched up by the armature lever 99 of a card feed clutch magnet CFM. When this magnet is energized, lever 99 releases dog 98 which at a predetermined point of the revolution of the shaft 12 and, hence, at a predetermined point of the cycle, 330° (Fig. 9), engages the notch of clutch disk 96. The driven clutch assembly is thereby coupled to continually rotating shaft 12. The driven clutch assembly includes a gear 100 acting through a gear train 102 to rotate a large gear 103. Gear 103 meshes with gears 104 for driving the feed rolls 92.

Also meshed with large gear 103 is a gear 105 to which is eccentrically connected one end of an arm 106 connected at the other end to a crank arm 107 of a shaft 108. The shaft 108 carries an arm 109 for operating the picker 91. Gearing 110 is also provided between gear 103 and the shaft of a plurality of cams CF which operate CF cam contacts referred to in the circuit description.

Thus, as a result of energization of magnet CFM, the card picker, card feed rolls, and cams CF are set in operation.

*Recording means (Fig. 3).*—Means are provided to record the data derived from the record cards. The machine may be set for listing or tabulating operation. In listing operation, the recording means is controlled by the data representations on each card to list the data as it is entered in the accumulators. When a change in card group occurs, the recording means records the total at the bottom of the list. The total recording is controlled by the accumulators. When the machine is set for tabulating operation, the recording means operates to record only the group number of the first card of each group and, upon a change in card group, to record the total pertaining to the group, usually on the same line as the group number.

The recording means comprises a platen roller 112 around which the sheet to be recorded on is fed. The line spacing or feed mechanism for the sheet and the controls therefor are disclosed in Patents 2,042,342 and 2,199,547 and need not be explained herein. Disposed in front of the platen roller are vertically slidable type carriers 113, each carrying transversely slidable type elements 114 normally held by springs (not shown) in rear positions. The type elements 114 in descending order bear the types for printing digits 9 to 0. Above the 9 type, some of the type carriers have a type element for printing a classifying symbol indicating a negative amount while others have a type element for printing a symbol denoting a positive amount.

Each type carrier 113 is connected at the lower end to an arm 115 pivoted at 116 and connected by a spring 117 to a common bar 118. Bar 118 is fixed between arms 119 fast to a shaft 120. Connected by links 122 to arms 119 is a restoring bail 123 overlying all the arms 115. Shaft 120 rigidly carries an arm 124 connected by a link 125 to a cam follower 126. The cam follower has two branches each engaging one of the complementary cams 127 fast to a cam shaft 128. During a revolution of shaft 128, cams 127 oscillate follower 126. During counterclockwise movement of follower 126, shaft 120 and arms 119 move clockwise. Restoring bar 123 also moves clockwise while springs 117 force the arms 115 to follow, thereby moving the type carriers 113 upwardly.

The type carriers may be individually arrested in differential positions with selected types at printing position. The arresting means includes ratchet teeth 129 provided in each type carrier and spaced similarly to the type elements 114. Arranged to coact with the ratchet teeth of each type carrier is a pawl 130 held by a latch 132 from engaging the ratchet teeth. Latch 132 is connected by a rod 133 to an armature 134 of a print magnet PM. When the magnet is energized, the latch 132 is released from pawl 130 which springs into arresting engagement with a tooth 129 of the type carrier. There is one such arresting means, including a print magnet PM, for each type carrier. A print magnet may be energized under control of perforations in record cards or under control of the accumulators during any of the first ten intervals of the cycle (see Fig. 9). The energization of magnet PM during the first cycle interval arrests the type carrier with the 9 type at printing position (see the last line of the timing chart, Fig. 9); energization of the magnet during the second interval arrests the type carrier with the 8 type at printing position, and so on. Energization of a print magnet during the last cycle interval causes the type bar to be arrested with a classifying symbol in printing position. When a type carrier is arrested, the associated arm 115 stops, and connected spring 117 stretches, while actuating arms 119 and restoring bail 123 continue to rock clockwise. After the period during which the type carriers may differentially be set in selected printing position, printing hammers 135 are tripped and strike the type elements at printing position to print the selected data, through a suitable ink ribbon, on the sheet carried by the platen. After the printing operation, the pawls 130 are restored into engagement with latches 132 by a common bail 136. The operations of the hammers and of bail 136 are described in Patent 2,079,418 and need not be explained further herein.

The printing means is operated only during desired cycles. When the machine is listing, the printing means operates every cycle in which a card is fed as well as in the total cycle. When the machine is set for tabulating the printing means operates during the cycle in which the first card of a group is fed and during a total cycle. The operating means for the printing means comprises a clutch disk 140 (Fig. 1) fixed to the continually rotating shaft 12 and having a single notch adapted to receive the tooth of a clutch dog 142. The clutch dog is carried by a driven assembly, including a gear 143, rotatably mounted on shaft 12. Normally, the clutch dog is latched up by armature lever 144 of print clutch magnet PCM. When this magnet is energized, dog 142 is released, engages the notched disk 140 and couples gear 143 to shaft 12 for rotation. Gear 143 serves through gear train 145 to rotate previously mentioned cam shaft 128 which carries the cams for operating the parts of the printing means. Gearing 146 connects shaft 128 to a shaft carrying P cams for operating P cam contacts referred to in the circuit description.

*PB switches (Fig. 3).*—A shaft 148 carries a plurality of cams 149, only one of which is shown. Following each cam is a bell crank lever 150 connected to a vertically movable bar 151 of insulating material and which is notched to receive the central blades of a plurality of two-sided PB switches. The cam 149 has three levels. Referring to the time chart, Fig. 9, throughout the value entering and type selecting period of a cycle, the highest level is keeping lever 150 in counterclockwise position in which the upper sides PBa of the switches are closed. At 207° of the cycle, the lowest level of cam 149 is engaging lever 150 maintaining it in clockwise position in which the lower sides PBb of the switches are closed for completing carry circuits which will be traced later. At 250° of the cycle, the intermediate level of a cam 149 is on lever 150 and the lever is in midposition in which both the upper and lower sides of the switches PB are open. At about 340°, the upper level of cam 149 again closes the PBa sides of the switches.

Shaft 148 has a gear 152 meshed with a gear 153, rotation of which serves to rotate shaft 148 and cams 149. Gear 153 is rotatably carried by shaft 14 and driven through suitable gearing from a card feed cycle shaft so that the cams 149 will shift the PB switches only during card feed cycles.

Figure 7:
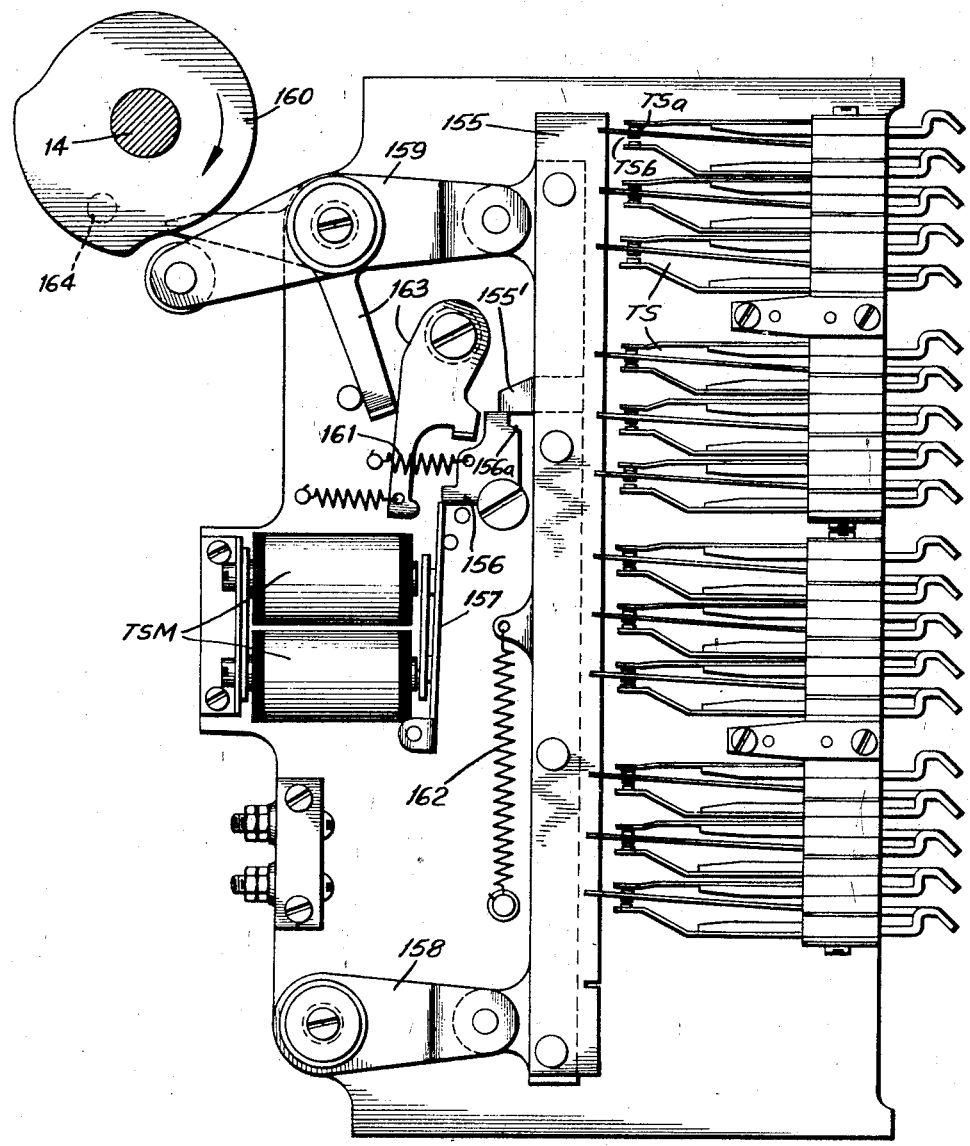
Fig. 7 is a side view of a total switch column and its control means.

*TS switches (Fig. 7).*—Carried by the machine frame are a plurality of columns of switches TS having upper sides TSa and lower sides TSb. The center blades of each column of switches are engaged with a vertical bar 155 of insulating material. The bar has a lug 155' above a pivoted member 156 which is latched by armature 157 of magnet TSM. The bar 155 is supported for vertical movement by a pair of levers 158 and 159, the upper lever 159 being adapted to follow a cam 160 on the continuously running shaft 14. When the bar 155 is in upper position, the upper sides TSa of the switches are closed. When magnet TSM is energized, member 156 is released by armature 157 and rocked counterclockwise by a spring 161, and as soon as the follower lever 159 rides off the high portion of cam 160, a spring 162 lowers bar 155 until lug 155' engages shoulder 156a of the member 156. In this lowered position of the bar, the lower sides TSb of the switches are closed. When a follower lever 159 again rides up on the high portion of cam 160, the bar 155 is elevated so that its lug 155' is above the top of member 156. The member 156 is restored to latching engagement with respect to lug 155' and to the armature 157 of magnet TSM by means of members 163 operated by a pin 164 on the cam 160.

As will be brought out later in the circuit diagram, magnet TSM is energized only for a total taking cycle to cause switch sides TSb to close. At other times, switch sides TSa are closed.

Circuits and operation

Assume a stack of cards composed of several groups is placed in supply hopper 90 (Fig. 1). The operator closes main switch S (Fig. 8a, left) placing current on opposite lines 165 and 166. Motor M is directly across these lines and immediately starts running, causing operation of the continually running clutch driving shaft 12 and the other continually running means including cams CB.

In the circuit diagrams, the relay coils are designated by R followed by a number and the relay contacts operated by a coil are designated by the reference notation of the coil followed by a small letter. A similar system of identification is used for relay magnets and contacts operated thereby, with the contacts being designated by numbers following the reference notation of the related magnet.

*Initial card feed cycles.*—The operator now depresses the start key (Fig. 8a, left) causing a circuit to be made from line 165 through start key contacts K, card feed clutch magnet CFM and control coil R5 in parallel, contacts R26b, INTa, and stop key contacts K', to line 166.

Magnet CFM, being energized, causes the card feed means to be set in operation for a cycle. During the first cycle, the first card just moves under the upper brushes UB. A special brush UB' (Fig. 8a, right upper) is located to one side of the card column locations for detecting absence of a card at the upper brushes and takes the place of the upper card lever contacts. The operations controlled by brush UB' will be explained in connection with the last card operations. During the first cycle, the first card is just under brushes UB and special brush UB'. The start key is held down to continue the card feed for a second cycle. During the second cycle, the first card is sensed by brushes UB and also closes lower card lever contacts LCL (Fig. 8a, left). A circuit is completed thereby from line 165 through lower card lever relay coil R3, contacts LCL, to line 166. Successive cards follow one another at a distance, so that between cards the contacts LCL open. Coil R3, however, is held through a shunt path including cam contacts CF7 and stick contacts R3a, and does not deenergize until the last card has passed the lower card lever and cam contacts CF7 have opened.

One or more columns of the cards bear group designations. If the upper and lower brushes UB and LB do not sense agreeing group designations, in successive cards, auto control means becomes effective to detect the group change and to initiate auto control operations. At the end of the second card feed cycle, the leading edge of the first card just moves under lower brushes LB. Thus, during the second cycle, the lower brushes LB have been sensing the bare contact roller 86 and the auto control means detects an apparent group change. For the present, it is sufficient to state that as a result of the group change, contacts R26b open to break the circuit of magnet CFM, causing card feed to be interrupted. Subsequently, a total print cycle occurs during which contacts P10 close. Contacts R26b also reclose and with auto start switch AS closed and lower card lever relay contacts R3b closed, a shunt circuit around start key contacts K is completed through magnet CFM and coil R5. The third card cycle then occurs. Coil R5 closes contacts R5a and with contacts R3b and R26b also closed, the start key contacts remain shunted and card feed clutch magnet CFM remains in operation after the start key is released until another group change occurs.

During the third card feed cycle, the first card passes the lower brushes LB and entries are made from the card into the accumulators. The cards will continue to feed and the entries to be made into the accumulators from the successive cards until a group change occurs. If the machine is set to list each entry, then the print means will be clutched each cycle. If the machine is set to tabulate, the print means will be clutched only during a total cycle and the first cycle following the total cycle.

To set the machine for listing, list switch LS is closed and the following circuit will be completed while cards are feeding (Fig. 8a, left):

*PCM list circuit.*—Line 166, print clutch magnet PCM, contacts R26a, INT5, R5b, list switch LS, contacts R3b, line 165.

If switch LS is open, the machine is in non-listing condition, and above circuit does not form but instead, in a manner described later, an alternative circuit is formed to energize magnet PCM during the first card cycle on a group of cards so as to cause printing of the group number.

*Card entries.*—The manner in which entries of values from the cards are made in the accumulators will now be explained. As explained before, the negative card values are accompanied by an X hole whereas the positive numbers are unaccompanied by the X hole. There is a group of plus and minus relay coils for each accumulator bank into which entries are to be made. For example, associated with Acc. #1 (Fig. 8b) are plus coils R65 connected in parallel to plus plug sockets $l_p$ and minus coils R64 connected in parallel to minus plug sockets $l_n$ (see middle of Fig. 8a). The plus sockets $l_p$ are connected by a plug wire 168 to the P (plus) plug socket of a class selector switch R31b, while the negative sockets are connected by a plug wire 169 to the N (negative) plug socket of this switch. The C (common) socket of the switch R31b is connected by a plug wire to a socket 170 (left side of Fig. 8a). The condition of switch R31b determines whether plus coils R65 or minus coils R64 will be energized. If, as a card is passing the upper brushes, an X hole is not sensed, indicating that the card bears a positive value, the coil R31 is not energized and contacts R31b remain in normal condition. At 288° of the cycle in which the card has been sensed by upper brushes UB, cam contacts CF23 (see Fig. 9 for timing), close and with contacts R31b in normal condition, the following circuit forms (start with the left side of Fig. 8a):

*Plus coils circuit.*—Line 166, contacts LCL or through cam contacts CF7 and contacts R3a, plug socket 170, a plug wire (not shown) to socket C of switch R31b (middle of Fig. 8a), the normally closed side of this switch, plug wire 168, socket $l_p$, coils R65, cam contacts CF23, line 165.

Figure 8B:
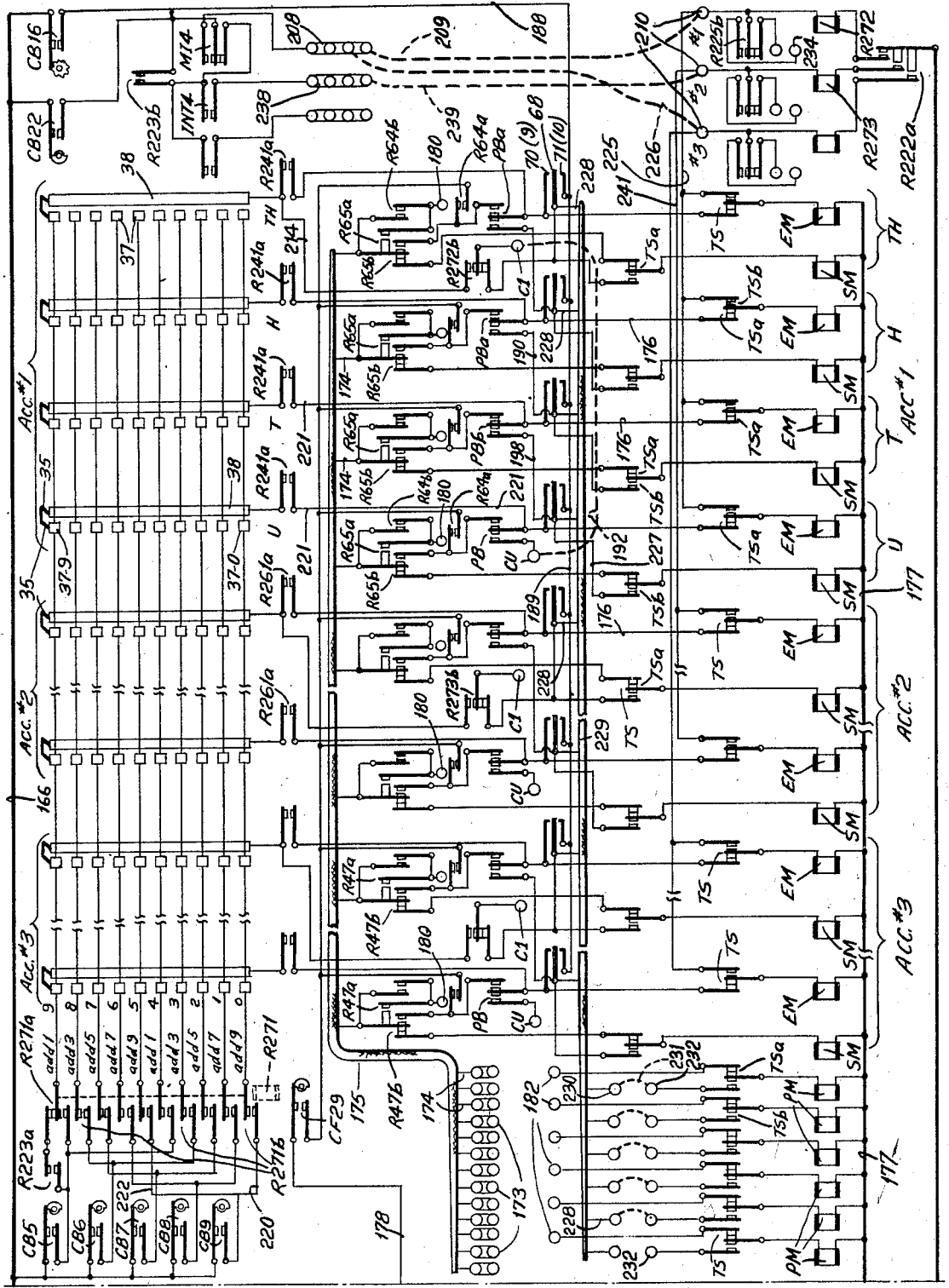

Coils R65 close the relay contacts R65a and shift the relay contacts R65b in each order of Acc. #1 (see Fig. 8b). Cam contacts CF23 remain closed during the 9 to 1 digit sensing period of the next cycle when the card is passing through the lower analyzer. Thus, contacts R65a and R65b remain in operated condition as the card is being sensed by the lower brushes LB for digit 9 to 1 perforations. When a brush LB senses a digit perforation in a card column to which an order of Acc. #1 is assigned, the following circuit forms (start with right side of Fig. 8a):

*Add circuit.*—Line 166, contacts R3c and CF2, lower contact roll 96, a brush LB, the connected brush socket 172, a plug wire (not shown) to one of the plug sockets 173 (left side of Fig. 8b), the wire 174 connected thereto and through cable 175 to the center blade of contacts R65b of the order assigned to the sensed column. The circuit continues through the right side of contacts R65b, the side PBa (closed during digit sensing) of the connected PB switch, a wire 176, the side TSa of the related switch TS, the entry magnet EM, to a common bus 177 for the magnets EM, SM, and PM. Turning now to Fig. 8a, the circuit is completed from bus 177 through circuit breakers CF17, 18, CB1, CB2, CB3, and CB4, to line 165.

The bus 177 will be considered in subsequent circuits as the return line for entry, printing control, carry circuits, etc., and it will be unnecessary to trace such circuits beyond bus 177 to line 165.

The above circuit energizes magnet EM at a differential time corresponding to the analyzed positive value, entering this value in the accumulator.

Simultaneously with the completion of an adding circuit, a circuit is completed through a print magnet PM as follows:

*PM list circuit.*—Beginning as in the preceding circuit and proceeding via cable 175 to the contacts R65a, a plug socket 180, a plug wire (not shown) to a plug socket 182 (lower, left of Fig. 8b), the closed side TSa of the connected TS switch, a print magnet PM, to bus 177.

If the machine is set for listing, the print clutch magnet PCM will have been energized and the print cycle means will be operating. Therefore, energization of a magnet PM under control of the card perforation will position the type carrier 113 (Fig. 3) so that the type for printing the digit represented by the perforation will be in printing position. The printing operation will occur in the manner explained before to print the digits represented on the card and entered in the accumulator.

*Negative value controls.*—During the X hole sensing period, cam contacts CF6 are closed and a circuit (center of Fig. 8a) is established from line 165 to wire 183, plural coil relay magnet MCR8, contacts CF6, to line 166.

Magnet MCR8 closes pairs of contacts MCR8a, one pair of which is in series with an X pickup relay coil R30 (right, Fig. 8a). When a card bears a negative value, it has an X hole in the selected column. When an upper brush senses this X hole, the following circuit is completed (Fig. 8a, right):

*X pickup circuit.*—Line 166, contacts CF11, the upper contact roll 95, the brush UB sensing the X-bearing column, its plug socket 184, a plug wire 185 to a socket 186, contacts MCR8a, coil R30, contacts R2a, to bus 177.

Coil R30 closes contacts R30a forming a circuit through holding coil R30H and coil R31 as follows (Fig. 8a, center): Line 165, wire 187, in parallel through coils R30H and R31, contacts R30a, cam contacts CF21, to line 166.

Cam contacts CF21 remain closed until after the 9 to 1 digit entry period of the next card feed cycle, and during this period coil R31H keeps the class selector R31b switch in shifted condition. With switch R31b in shifted condition, the "Plus coils circuit" traced above is not made. Instead, the circuit is made through the negative coils R64 from line 166, through contacts CF7 and R3a or through contacts LCL (left side of Fig. 8a), plug socket 170, plug wire (not shown) to socket C of switch R31b (center of Fig. 8a), the left side of this switch, socket N, plug wire 169, socket $l_n$, coils R64, contacts CF23, to line 165.

Coils R64 close relay points R64a of Acc. #1 (see Fig. 8b), and when cam contacts CF29 close at the "9" digit sensing point of the cycle during which the card with the negative value is passing the lower analyzer, the following circuit is formed:

*Negative entry initiation.*—Line 166, contacts R3c (upper right of Fig. 8a), wire 178 (continue with Fig. 8b), contacts CF29, R64a, the upper, now-closed side PBa of a pair of contacts PB, the normally closed side of a total contact TS, the entry magnet EM, to bus 177.

The above circuit forms through the entry magnet of each order of Acc. #1 and starts entry operation as though to add a 9 digit. As the card proceeds through the lower brushes, the negative value perforation is sensed, causing a differentially timed circuit to be completed as follows (start with Fig. 8a, right side):

*Negative entry completion.*—Line 166, contacts R3c, CF2, contact roll 96, a brush LB, a plug socket 172, plug wire (not shown) to a plug socket 173 (left side, Fig. 8b), cable 175, the closed side of contacts R65b, the normally closed side TSa of a switch TS, the subtraction magnet SM, to bus 177.

Energization of magnet SM interrupts entry operation of the accumulator order at a time dependent on the sensed negative value. Hence, the accumulator order will have added the difference between digit 9 and the negative digit on the card; that is to say, the nines complement of the negative digit.

It should be noted, further, that with plus relay contacts R65a in normal open condition, the connection between the cable 175 and socket 180 of the "PM list circuit" is completed, instead of through R65a, through negative relay contacts R64b, now closed.

*Carry operations.*—When a register order passes from 9 to or past 0, the related short transfer contact 71 is engaged with brush 68 (see Fig. 4). If a register order is at "9" after the 9 to 1 digit entry period, then the long transfer contact 70 is engaged with brush 68 (see Fig. 5). After the digit entry period and at about 207° (see the timing chart Fig. 9), the lower sides PBb of the PB switches (Fig. 3) are closed and when cam contacts CB16 close at about 225°, the carry circuits prepared by the long and short carry contacts 68—70 and 68—71 are simultaneously established from one order to another. For example, assume the units order has passed 0 position and its carry contacts 68—71 are closed and that the tens order is at 9 position with its carry contacts 68—70 closed. When contacts CB16 close at about 225°, the following circuits are established (right side, Fig. 8b):

*Short carry circuit.*—Line 166, contacts CB16, wire 188, short carry contact 71 of the units order, brush 68, wire 190 to the PBb contacts of the tens order, wire 176, the normally closed side TSa of the connected TS contacts, entry magnet EM of the tens order, to bus 177.

In the manner explained before, the carry entry is limited to a unit entry by the action of camming roller 56 of the entering means on the clutching lever 41 (see Fig. 4).

If the tens order is at "9" at the carry time, then simultaneously with the above circuit, a branch circuit extends from the side PBb of the tens order through long carry contacts 70 of the tens order, brush 68, a wire 190, the contacts PBb of the hundreds order, a wire 176, connected TSa contacts, magnet EM of the hundreds order, to bus 177.

For purposes of the disclosure, accumulator bank Acc. #1 illustrated in the circuit diagram, Fig. 8b, has four orders. The units, tens, hundreds orders, respectively designated U, T, and H, are presumed to be of such capacity as to contain any true negative or positive total accumulated from the card field assigned to the Acc. #1. Above the hundreds order H, Acc. #1 has a supplementary order TH connected to order H by a lower to higher order carry means such as described before. As will be brought out later, the supplementary order will register either 0 or 9. The presence of 0 in the supplementary order indicates that the balance is a positive amount, whereas the presence of 9 in the supplementary order indicates that the balance is the complement of a negative amount. By means to be described presently, the supplementary order automatically controls means for reading out the balance as a true number, negative or positive. Another function of the supplementary order is to maintain in the accumulator a correct registration in true numbers of a positive balance of negative and positive entries, and when the balance is negative to maintain in each order, including the units order, the nines complement of the negative balance. For this purpose, a supplementary carry is provided between the supplementary order and the units order effective to carry unity to the units order whenever the supplementary order moves from 9 to or through 0 and whenever the supplementary order is at 9 and a carry is effected thereto from the preceding order. To provide for the supplementary carry, a plug wire 192 connects a socket CI of the supplementary order to a socket CU of the units order (Fig. 8b). When the supplementary order moves from 9 to 0, its brush 68 is engaged with short carry contact 71, and during the carry period of the cycle, the following circuit is completed (Fig. 8b, right):

*Supplementary carry circuit.*—Line 166, contacts CB16, wire 188, contacts 71 of the supplementary order, engaged brush 68, the normally closed side of contacts R272b, socket CI, the plug wire 192 to socket CU, the side PBb of the units order (closed during carry time), the normally closed side of the connected pair of TS contacts, the units order entry magnet EM, to bus 177.

If the supplementary order TH is at 9 prior to the carry period, its brush 68 is engaged with long carry contacts 70. Then, if in the carry period, the hundreds order carries unity to the supplementary order, a long carry also would be effected, in the manner explained before, through contact 70 and brush 68 of the supplementary order, to the units order.

To explain further the mode of operation of the accumulator, assume that the cards of a group bear amounts as follows:

| | |
|---|---:|
| 1st card | +532 |
| 2nd card | −531 |
| 3rd card | −105 |
| 4th card | −100 |
| 5th card | +205 |

The result of the entries may be tabulated thus:

| | Kind of No. | Card | TH | H | T | U |
|---|---|---|---|---|---|---|
| 1 | True | 1st | 0 | 5 | 3 | 2 |
| 2 | 9 complement | 2d | 9 | 4 | 6 | 8 |
| 3. Before carry | | | 9 | 9 | 9 | 0 |
| 4. Carry | | | 1 | 1 | 1 | 1 |
| 5. Balance | True | | 0 | 0 | 0 | 1 |
| 6 | 9 complement | 3rd | 9 | 8 | 9 | 4 |
| 7. Balance | do | | 9 | 8 | 9 | 5 |
| 8 | do | 4th | 9 | 8 | 9 | 9 |
| 9. Before carry | | | 8 | 6 | 8 | 4 |
| 10. Carry | | | 1 | 1 | 1 | 1 |
| 11. Balance | 9 complement | | 9 | 7 | 9 | 5 |
| 12 | True | 5th | | 2 | 0 | 5 |
| 13. Before carry | | | 9 | 9 | 9 | 0 |
| 14. Carry | | | 1 | 1 | 1 | 1 |
| 15. Balance | True | | 0 | 0 | 0 | 1 |

Line 5, above, indicates a positive balance of 1. Line 7 registers the 9 complement of a negative balance 104. Line 11 registers the 9 complement of negative balance of 204. Line 15 indicates a positive balance of 1. It may be understood from lines 5, 6, and 7 that whenever a balance changes from positive to negative, the supplementary carry does not take place. This follows from the fact that the supplementary order is at "0" for the positive balance and that when the balance becomes negative, the supplementary order must move to but no further than "9." On the other hand, whenever a balance changes from negative to positive, the supplementary order moves from 9 to 0 and a carry is effected to the units order. This causes the positive balance to be corrected by addition of unity. Also, whenever a negative amount is added to a negative balance, the supplementary order moves from 9 to the next 9 and a carry is effected to maintain the correct nines complement figures in all the orders, including the units order, of the accumulator.

It is desired to record the total of amounts entered from each group of cards. Further, it is desired to record the total whether negative or positive as a natural number. As explained before, if the supplementary order registers 0, the accumulator registers a positive total whereas if the supplementary order is at 9, the accumulator contains the nines complement of a negative balance. Controls are provided to detect the presence of a 9 in the supplementary order in order to render means effective for converting the nines complement of the negative balance into a natural number representing the true negative balance. The conversion is effected according to the present invention by novel means operating according to a novel principle. This principle of complement conversion is based upon adding the difference between the individual nines complement digit and its corresponding natural digit and suppressing all carry operations between orders during the conversion. The following tabulation indicates the complement figures, the amount added thereto during a conversion cycle, and the natural figure which will be recorded after conversion:

| Complement in accumulator order | Amount added (carrying suppressed) | Figure printed after conversion |
|---|---|---|
| 9 | 1 | 0 |
| 8 | 3 | 1 |
| 7 | 5 | 2 |
| 6 | 7 | 3 |
| 5 | 9 | 4 |
| 4 | 1 | 5 |
| 3 | 3 | 6 |
| 2 | 5 | 7 |
| 1 | 7 | 8 |
| 0 | 9 | 9 |

For example:

Complement registered in accumulator____ 9784
Amount added during conversion cycle, carrying being suppressed_____ 1531

Result after conversion_____ 0215

The amount 215 would then be printed as the true negative balance, suitably identified in a manner explained later.

The events leading to the printing of the total are initiated by the auto control means as a result of a change in card group. The auto control means will now be explained.

*Auto control means.*—Each card has a card field or fields bearing group designations. The sockets 184 of the brushes UB (Fig. 8a, right) which sense the columns of the group designating field are connected by plug wires 194 to sockets 195 wired to upper group comparing relay coils R130, R132, R134, R136, etc. The sockets 172 of the lower brushes LB for sensing the group designating columns are connected by plug wires 196 to the sockets 197 of lower comparing relay coils R129, R131, R133, R135, etc. There is one such upper comparing coil and one lower comparing coil for each column of the group designating field.

During each card feed cycle, a circuit forms from line 165, through wire 187 (lower, center of Fig. 8a), parallel coils R169 and R170, cam contacts CF19, to line 166. Coil R169 closes a group of R169a contacts in series with upper comparing coils while coil R170 closes R170a contacts in series with lower comparing coils. It is to be understood that as many such coils as R169 and R170 and related contacts may be used as found expedient.

When an upper brush sensing a group designating column finds a perforation, the following typical circuit forms (Fig. 8a, right):

*Upper group control pickup.*—Line 166, cam contacts CF11, contact roll 95, brush UB, plug socket 184, plug wire 194 to a socket 195, upper comparing coil R130, the lowest relay contacts R169a, contacts R2a, to bus 177.

A similar circuit is established through the lower comparing coil R129, extending from line 166, through relay contacts R3c, cam contacts CF2, the contact roll 96, a brush LB, socket 172, plug wire 196, lower comparing coil R129, lowest contacts R170a, to bus 117.

Coils R129 and R130 respectively close contacts R129a and R130a to energize holding coils R129H and R130H, as follows (center of Fig. 8a): Line 165, wire 199, in parallel through coil 129H-contacts 129a and coil R130H-contacts R130a, cam contacts CF30, to line 166.

Coils R129H and R130H hold contacts R129b and R130b in shifted position until contacts CF30 open after the 9 to 1 sensing period of the cycle.

In a similar fashion, coils R131H, R132H may be energized under control of second group indicating columns under the lower and upper brushes. Other group indicating columns control energization of similar relays, each including a pick up coil and a companion holding coil. Several such pick up coils are shown and designated in Fig. 8a as R133, R134, R135, and R136. The companion holding coils are omitted to simplify the drawing but it will be understood that they are controlled by the pick up coils and arranged in the circuit in the same way as coils R129H to R132H. Assume the first two group indicating columns are for minor control, the first three for intermediate control, and the entire four columns for major control. The b contacts of the above holding coils are connected as shown to plug sockets 201 (upper right, Fig. 8a). For the assumed manner of control, the plug socket 201 connected to the contacts R129b and R130b is connected by plug wire to a socket 201 of contacts R131b and R132b and a plug wire 202 is connected between one of the latter sockets 201 to the minor shunt socket MiS. Further, a socket 201 of contacts R133b and R134b is connected similarly by plug wire (not shown) to the intermediate shunt plug socket IS, while the socket 201 of contacts R135b and R136b is connected by plug wire to major shunt socket MjS. If the perforations in the first two group indicating columns agree, contacts R129b, R130b, R131b, and R133b will be simultaneously shifted from normal condition and will not close a circuit path. If any of these contacts is shifted, first, a circuit path is completed. For instance, if contacts R132b have been shifted first, then the following circuit will form (Fig. 8a):

*Minor control pickup.*—Line 166, contacts CB17 and 18, the right side of shifted contacts R132b, the left normally closed side of contacts R131b, connected socket 201, plug wire 202, minor shunt socket MiS, coil R126, wire 199, to line 165.

Coil R126 closes contacts R126a to form the circuit of holding coil R126H from line 165, through wire 199, coil R126H, contacts R126a, cam contact CB24, to line 166.

In a similar way, the intermediate holding coil R127H and the major holding coil R128H may be energized upon failure of the intermediate and the major indications to agree.

Coil R126H holds contacts R126b closed to energize minor auto control coil R26 during a test period, as follows (Fig. 8a, right):

*Minor auto control coil R26.*—Line 166, contacts R3c, cam contacts CF1, contacts R126b, minor auto control switch S4, coil R26, contacts CB19, to line 165.

Coil R26 closes contacts R26c (center, bottom of Fig. 8a) to establish a circuit from line 165 through holding coil R26H and magnet MI in parallel, through contacts R26c, cam contacts P15, wire 204, to line 166.

In a similar way, coil R27H and INT coils and coil R28M and MA coils are energized under intermediate and major control these circuits extending, however, through cam contacts P16.

It may be observed that contacts R27b when closed connect the coils R27 and R26 in parallel, and that when contacts R28b are closed, coils R28 and R27 are connected in parallel. Thus, an intermediate group change causes energization of the minor control coil R26 along with intermediate control coil R27, and a major change causes coil R27, as well as R28, to be energized, in turn causing coil R26 to energize.

For the present, assume that the machine is set for minor auto control by closing switch S4 and that the intermediate and major auto controls are rendered inoperative by opening intermediate control switch S5 and major control switch S6.

Upon occurrence of a minor group change, minor auto control coil R26 is energized when cam contacts CF1 make at 220° of the card cycle during which the group change occurred. Energization of coil R26 causes coil R26H and relay magnet MI to be energized. Coil R26H opens contacts R26b in the card feed clutch magnet circuit (Fig. 8a, left), and the card feed cycle means will stop at 330° of the machine cycle. At 230°, contacts CB10 make, closing the following circuit (Fig. 8a, center):

*Balance test coils.*—Line 166, wire 204, cam contacts P15, now closed R26c contacts, wire 205, cam contacts CB10, closed R221a contacts, and in parallel through balance test coils R222 and R223, wires 206 and 207, to line 165.

Coil R222 closes R222a contacts (Fig. 8b, lower right) and when cam contacts CB22 (Fig. 8b, upper right) make at 245°, the following circuit forms (Fig. 8b):

*Minor class of total.*—Line 166, contacts CB22, the upper side of the now shifted minor control relay contacts MI4, minor class of total plug socket bank 208, a plug wire 209 to #1 plug socket 210, a class of total coil R272, a pair of contacts R222a, to line 165.

Figure 9:
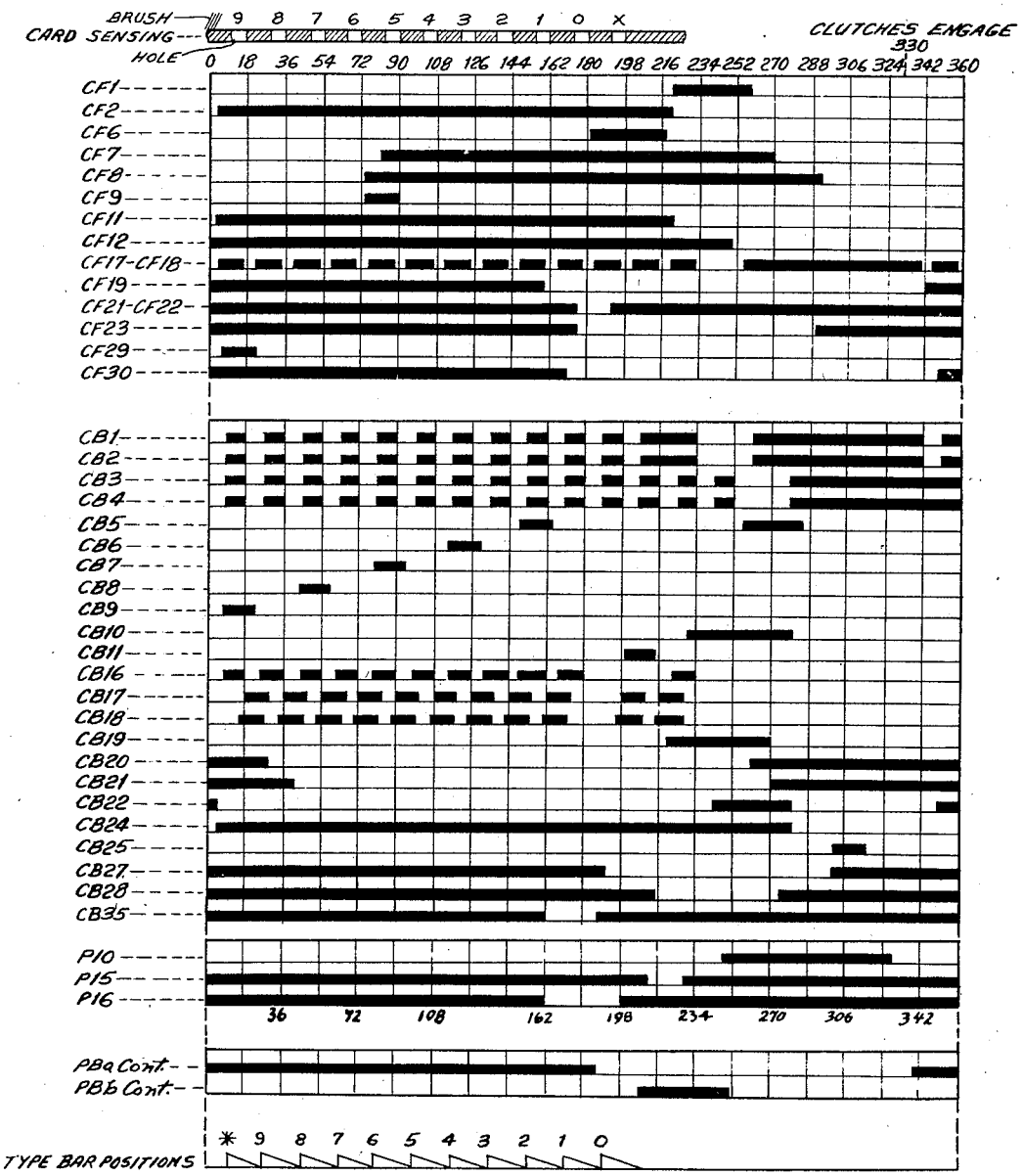
Fig. 9 is a timing chart.

Coil R272 opens the normally closed side of contacts R272b (Fig. 8b, right center) in the supplementary carry circuit and closes the upper side, connecting the latter side to plug socket C1 of the supplementary order. The socket C1 is connected by a plug wire (not shown) to a plug socket 212 (Fig. 8a, top center), connected through relay contacts R272a, now closed, to a balance detecting coil R225. Balance test coil R223 is still energized through cam contacts CB10 when cam contacts CB5 (upper left of Fig. 8b) close at about 258° (Fig. 9). Accordingly contacts R223a in series with contacts CB5 are now closed. If a supplementary order registers 0, manifesting the presence of a positive balance, a circuit is not completed through cam contacts CB5 and R223a. However, if the supplementary order registers 9, thus indicating a negative balance, the closure of cam contacts CB5 at about 258° of the cycle in which the group change occurred, completes the following circuit (Fig. 8b):

*Negative balance detecting coil.*—Line 166, contacts CB5, contacts R223a, the normally closed side of contacts R271a, the commonly connected "9" segments 37 of the readout commutators of all the orders, a brush 35 engaging the 9 segment 37 of the supplementary order TH, the opposite brush 35 of this order, common segment 38 thereof, a wire 214, the upper, now-closed side of contacts R272b, plug socket C1, the plug wire (not shown) to socket 212 (Fig. 8a), now closed R272a contacts, negative balance detecting coil R225, wires 206 and 207 to line 165.

Coil R225 closes R225a contacts, forming a circuit through holding coil R225H which extends as follows (Fig. 8a):

*Coil R225H.*—Line 166, minor relay contacts MI5, outer contacts R225a, coil R225H, wires 206 and 207, to line 165.

When cam contacts CB28 close at about 275°, the circuit of coil R225H also extends through these cam contacts which are in parallel with the MI5 contacts.

When relay contacts R225a closed, the following circuit also was completed (Fig. 8a):

*Negative balance control coil.*—Line 165, wires 207 and 206, a coil R220, inner contacts R225a, and through MI5 (later, also through CB28), to line 166.

Coil R220 closes contacts R220a, and when cam contacts CB27 (Fig. 8a, upper center) close at about 300°, the following circuit forms:

*Negative balance conversion control.*—Line 166, cam contacts CB27, wire 216, normally closed R221b contacts, contacts R220a, parallel coils R265 and R271, wires 206 and 207, to line 165.

Coil R265 now closes contacts R265a, forming the following circuit (Fig. 8a, middle):

*Conversion coil.*—Line 165, wires 207 and 206, coil R241, contacts R265a, outer contacts R225a, in parallel through contacts CB28 and MI5, to line 165.

Coils R271 and R241 have been energized at about 300° at which point the cam contacts CB27 of the "Negative balance conversion control" circuit closed. Coil R271 closes the lower side of R271a contacts (Fig. 8b, upper left), connecting the "9" segments 37 to cam contacts CB5. Coil R271 also closes a group of contacts R271b, each in series with a different one of the "8" to "0" rows of segments 37 of the readout commutators. Coil R241 closes a set of contacts R241a, each in series with one of the common contact segment 38 of Acc. #1. During the machine cycle following the one in which the group change occurred, conversion by addition occurs to convert the nines complement balance to the true figures. The cycle during which the conversion occurs may be referred to as the conversion cycle. During this cycle, cam contacts CB9 (Fig. 8b, upper left) close at the "9" perforation sensing point, and if any readout commutator is registering 0 or 5, an entry circuit will be formed therethrough, converting the registration to 9 or 4. Thus, if the units order U of Acc. #1 is registering 0, the following circuit will be formed (Fig. 8b):

*Conversion circuit.*—Line 166, cam contacts CB9, wire 220, lowest contacts R271b, the commonly connected 0 segments 37, the brush 35 of the units order engaging segment 37—0 of the units order, the opposite brush 35, units order common contact segment 38, the connected pair of contacts R241a, wires 221 and 176, the normally closed side TSa of the connected TS contacts, entry magnet EM of the units order, to bus 177.

The above circuit adds 9 to the units order, converting its nines complement 0 to the true figure 9.

If the tens order is registering the nines complement 5, then when cam contacts CB9 close, a circuit such as traced above extends from contacts CB9 through wire 222 to the contacts R271b in series with the 5 segments 37, thence through the brush 35 of the tens order engaging the 5 segment, the other brush 35, the common segment 38 of the tens order, the connected R241a contacts, wires 221 and 176 to the tens order magnet EM, to bus 177. The tens order will then add 9 to its nines complement 5, converting its registration to the true negative number 4.

Similarly, conversion circuits are formed through cam contacts CB8 to add 7 to nines complement readings of 6 or 1, converting the reading into the true figure 3 or 8. Likewise, if any order registers the nines complement 2 or 7, the closure of cam contacts CB7 enters 5, converting the reading into the true figures 7 or 2. Further, if any order registers the nines complement 3 or 8, the closure of cam contacts CB6 adds 3, converting the reading into the true figure 6 or 1. Finally, if a register order has the nines complement 4 or 9, the closure of cam contacts CB5 enters 1, converting the reading into 5 or 0.

Thus, if the complement in the accumulator was, for example, 9742, it will be converted by addition of 1515 to 0257 which is the negative balance in true figures.

The auto control coil R26H opened contacts R26b in the card feed clutch magnet circuit (Fig. 8a, left side) prior to the conversion cycle. Hence, the card feed cycle means is idle during the conversion cycle and the PB switches remain in initial position in which the PBa sides are closed and the PBb sides are open. With the PBb sides open, carry circuits cannot be established. Thus, carrying does not take place during the conversion cycle but is suppressed, so that by addition of the conversion amount to the nines complement the true negative balance is obtained.

At 190° of the conversion cycle, cam contacts CB27 reopen, breaking the "Negative balance conversion control" circuit of coils R265 and R271. As coil R265 deenergizes, contacts R265a reopen, breaking the "Conversion coil" circuit of coil R241.

At 200° of the conversion cycle, cam contacts CB11 (Fig. 8a, center) close, energizing coil R221 through a circuit extending from line 165 through wires 207 and 206, coil R221, cam contacts CB11, wire 205, contacts R26c and P15, to line 166.

Coil R221 closes contacts R221c, forming a circuit for holding coil R221H which extends from line 165 through wires 207 and 206, through coil R221H, contacts R221c, and to line 166 through contacts MI5 and later through CB28. Coil R221H opens contacts R221b of the "Negative balance conversion control" circuit of coils R265 and R271 to prevent this circuit from being established again when contacts CB27 reclose at 300° of the conversion cycle.

Coil R221H also opens contacts R221a in the "Balance test coils" circuit, deenergizing coils R222 and R223. Coil R222 being deenergized, contacts R222a (Fig. 8b, lower right) reopen, breaking the "Class of total" circuit through coil R272. All the relays operated as a result of detecting a negative balance circuit, except coil R225H and its contacts, are now in normal condition.

Coil R221H also closes contacts R221d and when cam contacts CB21 (Fig. 8a, bottom, left center) close at 270°, the following circuits are completed (Fig. 8a):

*Total switch magnets.*—Line 165, contacts CB21, R221d, minor auto total switch S8, wire 224, the right, now-closed side of shifted contacts MI3, in parallel through magnets TSM, to line 166.

*Total PCM circuit.*—Starting as in the preceding circuit and continuing from switch S8 through the right, now-closed side of contacts MI2, through print clutch magnet PCM to line 166.

At 306° of the conversion cycle, cam contacts CB25 close, forming the following circuit:

*Group indication control circuit.*—Beginning as in the preceding circuits and proceeding from the right, now-closed side of contacts MI3 through contacts CB25 and relay coil R7, to line 166.

Energization of the total switch magnets TSM permits the TS switches to be shifted under control of the cams 160 (see Fig. 7) so as to open sides TSa and close sides TSb.

Energization of magnet PCM causes the print cycle means to be clutched for operation at 330° of the conversion cycle.

Energization of the relay coil R7 closes contacts R7a to form a circuit (Fig. 8a) for holding coil R7H extending from line 165 through wire 187, coil R7H, contacts R7a, and to line 166 through cam contacts CF22. The purpose of this coil R7 is to enable the print clutch magnet to be energized during the first card cycle following total recording when the machine is set for non-listing, as will be explained later in detail.

*Total recording operations.*—At 351° which may be referred to as the "10" time, cam contacts CB22 close again, establishing the following circuit (Fig. 8b, upper right):

*Total readout.*—Line 166, contacts CB22, the upper now-closed side of contacts MI4, plug socket bank 208, plug wire 209, #1 plug socket 210, wire 225, the now-closed switch sides TSb of Acc. #1, and through the entry magnets EM of Acc. #1 to bus 177.

It is desirable to read out the group number upon a minor group change. Assume that Acc. #3 registers the group number. A plug wire 226 is connected between minor socket bank 208 (Fig. 8b, right) and the #3 socket 210. Accordingly, simultaneously with energization of the Acc. #1 entry magnets by the "Total readout" circuit, similar circuits will be formed through the entry magnets EM of Acc. #3.

The energization of magnets EM by the "Total readout" circuits occurs when cam contacts CB22 close one interval before the "9" perforation sensing point of the cycle. As explained previously, the clutch disk 28 (Fig. 4) picks up clutch disk 30 and starts rotating the register nearly one interval later. Consequently, energization of an entry magnet at the "10" time starts the registers rotating shortly before the mid-point of the first cycle interval. The readout advance of each of the accumulator orders is arrested when it reaches 0 position. This is effected by energizing the subtract magnets SM under control of the short carry contacts 68—71 which close as an order moves from 9 to 0 position. For example, if order U is at 8, then during its second step of movement its contacts 68—71 close, causing magnet SM to energize. As a result, the order U will be arrested in 0 position. The circuit for energizing a magnet SM when contacts 68—71 make is as follows (Fig. 8b):

*Zeroizing circuit.*—Line 166, circuit breaker contacts CB16, wire 188, contacts 71 and brush 69 of the units order, a wire 227, the now-closed side TSb of the connected TS switch, unit order subtract magnet SM, to bus 177.

Energization of magnet SM restores the clutching lever 41 (Fig. 4) to latched position, causing the accumulator order to stop in zero position.

The type carriers 113 (Fig. 3) are set to print totals by energization of magnets PM under control of carry contacts 68—71, as follows:

*PM total circuit.*—Beginning as in the preceding circuit and proceeding from the center brushes 69 through wires 228 (one for each order), gathered in a cable 229 and extending to plug sockets 230; thence through plug wires 231 to plug sockets 232, the now-closed sides TSb of connected switches TS, print magnets PM, to bus 177.

Energization of magnets PM stops type carriers 113 in positions for printing the balance accumulated by the accumulator orders. Thus, when units order U registers 2, it will start rotating during the first cycle interval and close contacts 68—71 at about the beginning of the ninth cycle interval. At this point, magnet PM will energize, causing the type bar 113 of the units order to be arrested with the 2 type in printing position (see the last line of the timing chart, Fig. 9).

It is desirable to denote a negative balance by printing a negative symbol alongside the total. For this purpose, one of the type bars with a negative symbol type is to be brought to printing position at the "10" time. Assume this type bar to be the one associated with the left hand magnet PM (Fig. 8b, left side). The socket 232 related to the left hand magnet PM is connected by a plug wire (not shown) to a socket 234 (Fig. 8b, bottom right). Socket 234 is wired to the upper side of relay contacts R225b. It will be recalled that upon detection of a negative balance, the negative balance detecting coil R225 was energized followed by the formation of the coil R225H circuit which is maintained until relay contacts MI5 and cam contacts CB28 open during the print cycle. Accordingly, the upper side of contacts R225b, connected to plug socket 234 (Fig. 8b, lower right) are now closed. The coil R222 has been deenergized by opening of contacts R221a1 in the "Balance test coils circuit," so that contacts R222a connected to coil 272 wired to #1 socket 210 are now open and coil 272 will not be energized during the print cycle when cam contacts CB22 close. With the upper side of contacts R225b1 closed, when contacts CB22 close at the "10" time, the following circuit forms (Fig. 8b):

*Negative symbol PM circuit.*—Line 166, contacts CB22, the upper, now-closed side of the MI4 contacts, plug socket bank 208, plug wire 209 to #1 plug socket 210, the upper side of contacts R225b, plug socket 234, a plug wire (not shown) to plug socket 232 associated with the selected left hand magnet PM, the now-closed side TSb of the related TS switch, the print magnet PM, to bus 177.

As a result, the negative symbol type will be set in printing position.

After the printing period of the total cycle, contacts P15 open, breaking the circuit of coil R26H and relay magnet MI. Contacts P10 close, establishing the auto start circuit through switch AS (Fig. 8a, left) of the card feed clutch magnet CFM and parallel coil R5. The card cycle means resumes operation at 330° of the print cycle.

When contacts CB28 open during the print cycle, coil R221H is deenergized.

It will be recalled that shortly before the print cycle started, relay coil R7 was energized, followed by energization of coil R7H. If the machine is set for non-listing, the PCM list circuit is not made. It may be desired, however, when the machine is set for non-listing to print the group number and other data from the first card of a group. For this purpose, contacts R7b shunting the list switch LS (Fig. 8a, at left) are closed. When contacts P15 opened, coil R26H was deenergized and contacts R26b closed, causing card feed clutch magnet CFM and parallel coil R5 to be energized. Consequently, contacts R5b are closed now. Also contacts R26a are now closed. When cam contacts CB20 close, a circuit is formed through magnet PCM which is similar to the "PCM list circuit" except that with list switch LS open and contacts R7b closed, the circuit of PCM magnet is routed through contacts R7b and cam contacts CB20. Accordingly, the print clutch magnet will remain energized and cause operation of the print cycle means to print the group number during the first card cycle following the total print cycle.

The group number (which may be assumed to be positive) is entered in one of the accumulator banks, for example, Acc. #3, only during the first card cycle of a card group. For this purpose, contacts R7c are connected to a plug socket bank 236 (Fig. 8a, to the left of the brushes LB), which is connected by a plug wire (not shown) to the plus socket 3p (top center, Fig. 8a). Socket 3p is wired to the parallel plus coils R47. During the first card cycle on a card group, a circuit will be completed from line 166 through contacts R3c, R7c, plug socket 236, plug wire (not shown) to plug socket 3p, coils R47, cam contacts CF23, wire 207, to line 165. Coils R47 close the R47a and b contacts of Acc. #3, preparing Acc. #3 to receive the group number from the first card of a group. The group number also may be printed by assigned type columns whose sockets 182 will be plugged to sockets 180 of Acc. #3.

When cam contacts CF22 open after the "1" digit sensing period, coil R7H is deenergized and its relay contacts reopen. Hence, entry in the accumulator of the group number will be effected only during the first card cycle on a card group.

If the machine is set for listing, the group number will preferably be printed in the first card cycle of a group as well as during a total taking cycle through the connections described.

If the machine is set for non-listing, the group number may be printed during the first card cycle on one line and also during the total cycle on another line. If it is desired to print the group number and total on one line, this is preferably done during the total cycle in the manner explained and the plug sockets 180 of Acc. #3 will not be plugged to list printing socket 182.

The explanation of the total printing operations has dealt with the case where a negative balance is standing in the accumulator at the time the group change occurs. If the accumulator were registering, instead, a positive balance, the supplementary order TH would be at 0 and brush 35 would not be engaging segment 37—9. Accordingly, the "Negative balance detecting coil" circuit would not be completed and coil R225 would not be energized. Hence, contacts R225c (Fig. 8a, lower left) would remain closed and with minor auto control relay contacts MI2 shifted, a circuit would be established through magnet PCM when cam contacts CB21 closed at 270° of the card cycle during which the group change occurred. A print cycle would then directly follow the latter card cycle and a conversion cycle would not intervene as was the case when a negative balance was detected.

*Intermediate auto control total operations.—*
If it is desired to operate the machine under intermediate auto control as well as minor auto control, both switches S4 and S5 are closed (Fig. 8a). The accumulator Acc. #2 may be assigned to accumulate entries from cards of an intermediate group. Upon the occurrence of an intermediate group change, intermediate auto control coil R27 is energized in the manner explained before, followed by energization of coil R27H and magnet INT. Contacts R27b will close and the minor auto control coils R26, R26H and MI also will be energized. The "Balance test coils" circuit will form, energizing coils R222 and R333. The "Minor class of total coil circuit" will be again established to energize coil R272. At the same time, with contacts R223b and INT4 closed, an intermediate "Class of total" circuit will be completed (Fig. 8b, right) from line 166 through cam contacts CB22, contacts R223b, INT4, intermediate class of total plug socket 238, a plug wire 239 to #2 plug socket 210, a coil R273, a pair of contacts R222a, to line 165. The socket CI of Acc. #2 (now connected to the upper closed side of contacts R273b) is plug wired to a socket 240 in series with contacts R273a (Fig. 8a, upper center). If Acc. #2 has a negative balance, its supplementary order will be at "9" and a circuit similar to "Negative balance detecting coil" circuit, traced before, will be formed through a coil R239. Contacts R239a will close, causing holding coil R239H (Fig. 8a) to remain energized until INT4b and CB28 both are open. As coil R265 has been energized by the "Negative balance conversion control" circuit, contacts R265b will be closed and a conversion coil R261 (Fig. 8a) will be energized. Contacts R261a in series with common segments 38 of Acc. #2 will close and with contacts R271b also closed, conversion circuits such as described before will be completed through the readout commutator of Acc. #2. Following the conversion, the minor total will be printed during a first total print cycle. The minor auto control relay coils are deenergized during the first total print cycle when contacts P15 open. However, before this happens, the MI6 contacts are still closed, shunting the P16 contacts during their open period. Thus, intermediate auto control coils R27H and INT (Fig. 8a, lower center) will remain energized until contacts P16 open during a second total print cycle. This second total cycle is effected by energizing print clutch magnet PCM through a path which includes intermediate auto total switch S9, contacts INT2 and the now-closed left side of the MI2 contacts. During the first total print cycle, the intermediate total will not be read out of the Acc. #2 commutator because contacts R223b (Fig. 8b, upper right) were previously opened, near the end of the conversion cycle, due to deenergization of coil R223, as explained before, and contacts MI4 are in shifted condition. The contacts MI4 return to normal condition when coils MI are deenergized during the first total print cycle. Hence, when cam contacts CB22 close at the "10" time (351°) of the first total print cycle, there will be a closed circuit path from line 166 through contacts CB22, the lower side of the MI4 contacts, the upper, still closed side of the INT4 contacts, a plug socket 238, plug wire 239 to #2 plug socket 210 and through wire 241 to the shifted sides TSb of the switches of the Acc. #2 accumulator to the entry magnets EM thereof. Zeroizing and total printing of the intermediate balance will then be effected during the second total print cycle in the manner indicated in connection with minor total accumulator Acc. #1. After printing has occurred, contacts P16 open, coils R27 and INT deenergize, and contacts INT1 (Fig. 8a, upper left) close, enabling the auto start circuit of card feed clutch magnet CFM to make.

Assume that with the machine set for minor and intermediate auto control operations, only a minor group change occurs and the intermediate accumulator Acc. #2 has a negative balance while the minor accumulator Acc. #1 has a positive balance. In that case, contacts INT4 would be open and coil R273 would not be energized. With contacts R273a and R273b open, the negative balance detecting coil R239 for detecting a negative balance in the intermediate accumulator will not form even though the supplementary order of the latter accumulator is at "9." Hence a conversion cycle will not take place but contacts R239c, as well as R225c (Fig. 8a, bottom, left) would remain closed and a total print cycle will follow directly after the last card cycle during which the minor group change alone occurred. It will be clear from the above explanation that a conversion cycle is not effected upon the minor group change if the minor total accumulator has a positive balance even though the intermediate total accumulator should contain a negative balance. On the other hand, upon an intermediate group change, a conversion cycle will occur when either the minor or intermediate total accumulator has a negative balance.

When the last card of a stack in supply hopper 90 (Fig. 1) passes the upper brushes, special brush UB' (Fig. 8a, upper right) engages the contact roll 95, energizing a coil R2 by a circuit extending from line 166 through contacts CF11, contact roll 95, brush UB', contacts CF9, coil R2, to line 165. Coil R2 closes stick contacts R2a which holds coil R2 energized until cam contact CF8 open.

Coil R2 closes contacts R2b, and the following circuit forms (Fig. 8a, right):

*Last card auto total.—*Line 166, contacts R3c, CF1, switch S10, contacts R2b, major auto control coil R28, contacts CB19 to line 165.

Energization of coil R28 results in the zeroizing of the major, intermediate, and minor accumulators and the printing of their totals.

When minor auto total switch S8 and intermediate total switch S9 (Fig. 8, lower left) are shifted to terminals 245, the total print cycles may be initiated by depression of the hand total key HT following a minor group change.

It should be noted that cam contacts CF12 (Fig. 8a, left side) shunt the stop key contacts K' and auto control relay contacts INT1 and R26b to time the opening of the card feed clutch magnet circuit.

It is to be understood that although only three accumulators Accs. #1, 2, and 3 have been shown, there are, in practice, more such accumulators provided, including one for accumulating major totals. In addition, negative balance conversion means may be provided for each additional accumulator bank.

*Progressive totaling.*—It may be desired to print progressive totals from a selected accumulator. In that case, the accumulator instead of being cleared when its balance is printed retains its balance which is accumulated with the balance of the next card group or groups until a selected group change occurs. For example, if Acc. #1 is selected for progressive totaling until an intermediate group change occurs, this accumulator will retain its first minor balance as this balance is printed. The second minor balance will be added to the first minor balance and the total of the two balances printed upon the second minor group change, and so on until an intermediate group change occurs. When the intermediate group change takes place, the total of all the minor groups within the intermediate groups is printed and Acc. #1 cleared. According to the principles previously described herein, when an accumulator has a complement, manifesting a negative balance, and total printing from this accumulator is indicated, the machine goes through a conversion cycle to convert the complement into the true figures of the negative balance and the total printing of the negative balance in true figures then takes place. If the accumulator is selected for progressive totaling, it is required, in order that the accumulator correctly accumulate the next group of items with the negative balance, that the converted balance first be restored to its previous complementary registration. According to the present invention, when an accumulator is selected for progressive totaling and has a negative balance, this balance is first converted into true figures, then total-printed without clearing; after the total-printing, the balance is reconverted into complementary form. The accumulator is then in condition to receive entries of the next group or groups of items. The conversion and reconversion occur only if the selected accumulator has a negative balance at the time the requisite group change occurs.

Fig. 10 shows the additions to the circuit diagram for enabling the machine to take progressive totals. A dial switch PD is provided for an accumulator bank from which a progressive total is to be taken. In Fig. 10 only one dial switch and related progressive totaling controls are shown, it being understood that as many dials and associated parts may be furnished as may be required. The dial switch has inner and outer sections so marked in Fig. 10. Each section has four points 1, 2, 3, and 4 and a common segment C. The inner section is provided with a switch blade SPa and the outer section with a switch blade SPb. These switch blades are insulated from each other on the same shaft 400 and commonly settable by hand to connect the common segments with corresponding points of the dial sections. Points 1 are for controlling progressive totals on all group changes, in which case the selected accumulator will be cleared only when the switch blades are shifted to points 2 which is the "off" position. Points 3 are for the control of progressive totals on minor group changes and clearing on an intermediate group change. Points 4 are for progressive totals on minor and intermediate group changes and clearing on a major group change.

For the present, assume that the switch blades are set at points 3 for controlling progressive totaling on minor changes and clearing on an intermediate change. Assume, further that Acc. #1 is selected for this progressive totaling operation.

With dial switch PD set at points 3, the following circuit forms: Line 166, point 3 of the inner section, switch blade SPa, the inner section common, a coil PT3, to line 165. Coil PT3 shifts contacts PT3a and PT3b. Contacts PT3a shift the circuit of "Negative balance detecting coil" R225H and "Conversion coil" R241 from MI5 and CB28 to cam contacts CB35. Contacts PT3b, when shifted, prevent the making of the circuit through "Negative balance control coil" R220 and prepare the circuit of a coil PT1 to be made when a negative balance is detected in Acc. #1.

As explained previously, during the card cycle in which a minor group change occurs, coil R26 (also see Fig. 8a, center right) is energized. For progressive minor totaling, a coil PT2 is in parallel with coil R26 and energized at the same time. Coil R26 when energized upon a minor group change causes energization of coil R26H and magnet MI. Coil PT2 closes contacts PT2a, forming the following circuit: Line 165, coil PT2H, PT2a contacts, MI5 and CB28, to line 166. The "Balance test coils" circuit, traced before, is established through coils R222 and R223. This is followed by the "Class of total coil" circuit of coil R272. The "Negative balance detecting coil" circuit of coil R225, traced previously is then established if Acc. #1 has a negative balance. Coil R225 closes contacts R225a and the circuit of coil R225H is now established from line 165, through coil R225H, outer contacts R225a, the upper side of contacts PT3a, and in parallel through CB35 and PT2b contacts (now closed by coil PT2 in parallel with coil R26), to line 166. A parallel circuit is formed through coil PT1 from line 165 through coil PT1, the upper side of contacts PT3b, the inner contacts R225a, and as in the preceding circuit to line 166. Coil PT1 closes contacts PT1a forming the circuit of "Negative balance conversion control" coils R265 and R271 through contacts PT1a, R221b, and CB27. Coil R265 closes R265a contacts to establish the circuit of conversion coil R241 as follows: From line 165, through coil R241, contacts R265a, outer contacts R225a, the upper side of contacts PT3a, in parallel through PT2b and CB35, to line 166. A conversion cycle then takes place during which the negative balance in Acc. #1 is converted into true figures.

At 190° of the conversion cycle, contacts CB27 reopen, breaking the circuit of coils R265 and R271. As coil R265 deenergizes, contacts R265a reopen, breaking the circuit of coil R241. At 200°, cam contacts CB11 close, energizing coil R221 in the manner explained before. Coil R221 closes contacts R221c, forming the circuit of coil R221H through MI5 and CB28. Coil R221 opens contacts R221a, deenergizing coils R222 and R223. Also, coil R221 opens contacts R221b to prevent the circuit of coils R265 and R271 from reclosing when contacts CB27 close at 300° of the conversion cycle. Finally, coil R221 closes contacts R221d, establishing the "Total switch magnet" circuit of magnets TSM and the "Total PCM" circuit. A total print cycle follows. Energization of magnets TSM shifted the TS switches to close the TSb sides. At the "10" time, the total "Readout initiation" circuits of entry magnets EM of Acc. #1 are established, setting the register means of the accumulator in rotation. A pair of contacts TSb in series with a progressive total relay magnet PTM were closed by energization of one of the TSM magnets. As a result, the following circuit is established: Line 166, normally closed MAJ10 contacts, INT10 contacts, point 3 of the outer section of dial switch PD, switch blade SPb, the outer section common, magnet PTM, contacts TSb in series therewith, to line 165. Magnet PTM closes stick contacts PTMa to form a holding circuit for the magnet which is in effect until the TSb contacts in series therewith open.

Magnet PTM opens normally closed PTMb contacts, each in series with a switch side TSb connected to a subtracting magnet SM of Acc. #1 (also see Fig. 8b). Only one such pair of contacts PTMb and its connection to the switch side TSb of one subtract magnet SM is shown in Fig. 10 but it is understood that other contacts PTMb are similarly provided in other orders of the accumulator or accumulators. As a consequence of the opening of contacts PTMb, the "Zeroizing circuit" normally energizing the magnets SM is disabled and magnets SM remain inactive. Consequently, with all the entry magnets having been energized at the "10" time, the register orders will rotate through ten steps before the mechanical knock-off cam roller 55 (Fig. 4) restores clutching lever 41 to declutching position. As a result, each register order of Acc. #1 moves to the value position ten steps away and which corresponds to the value position which the accumulator order had before the total cycle began. Although the "Zeroizing circuits" have not been established, the PM total circuits are completed in the same manner as before and the total standing in Acc. #1 is printed.

Normally, when contacts P10 close during the total print cycle, the "Auto start circuit" of card feed clutch magnet CFM is completed and a card cycle follows the total cycle. However, in progressive totaling, if a negative balance has been converted into true figures and read out, it must be reconverted into complementary form before the items of the next card group are entered. Accordingly, it is necessary to delay the card feed until after a reconverting cycle. The card feed cycle is delayed by interposing relay contacts PT1b contacts between the card feed clutch magnet CFM and auto control contacts R26b. The coil PT1 is energized only when a negative balance has been detected in the manner explained above and remains energized until the relay contacts PT2b and cam contacts CB35 are both open. During the print cycle, contacts MI5 and CB28 open, breaking the PT2 coil circuit and allowing contacts PT2b to reopen. But coil PT1 is still held through contacts CB35 which continue closed while contacts P10 are closed. Hence, the coil PT1 remains energized and contacts PT1b continue open to prevent closing of the "Auto start circuit" of magnet CFM. However, the auto start circuit of coil R5 is established in the normal way, closing contacts R5a shunting the P10 contacts and preparing the CFM magnet for energization when contacts PT1b reclose at 162° of the conversion cycle. Contacts R5b also close, preparing the list circuit or first card cycle printing circuit of magnet PCM to make when contacts RT1c reclose.

Coil R221H was deenergized during the total print cycle when contacts CB28 and MI5 opened. Hence, contacts R221a, b, c, and d are now in normal condition. As coil PT1 is still energized, contacts PT1a are closed and with contacts R221b reclosed, the circuit of coils R265 and R271 is again established upon closure of contacts CB27 at 300° of the total print cycle. Coil R225H has also remained energized through cam contacts CB35 and, hence, contacts R225a are closed. Accordingly, when contacts R265a close again, the circuit of coil R241 is reestablished. With coils R241 and R271 energized, the conversion circuits are formed during the next machine cycle which may be considered as the reconversion cycle. During the conversion cycle preceding total printing, the conversion has been effected according to the following plan:

| Complement in accumulator | Conversion digit | True value |
|---|---|---|
| 9 | 1 | 0 |
| 8 | 3 | 1 |
| 7 | 5 | 2 |
| 6 | 7 | 3 |
| 5 | 9 | 4 |
| 4 | 1 | 5 |
| 3 | 3 | 6 |
| 2 | 5 | 7 |
| 1 | 7 | 8 |
| 0 | 9 | 9 |

During the reconversion cycle, the conversion digits are again added. It will be noted from the above tabulation that the two conversion digits added during the conversion and reconversion cycles add up to 10. For instance, during the conversion cycle, a complement "6" is converted to true figure "3" by adding conversion digit "7." During the reconversion cycle, the conversion digit "3" is added to reconvert the true figure "3" to nines complement figure "6." The sum of the two conversion digits "7" and "3" is "10." It will be seen that in every case, the conversion digits added during conversion and reconversion cycles total "10," thus restoring each order of Acc. #1 to its original nines complement registration.

At 162° of the reconversion cycle, contacts CB35 open, breaking the circuit of coils PT1 and R225H. Contacts PT1b and c reclose and a card feed and print cycle follows the reconversion cycle.

Upon an intermediate group change, coil R27H and magnet INT (center of Fig. 8a) are energized. Contacts INT10 open preventing the circuit of magnet PTM from being completed when contacts TSb in series with the magnet close at the start of a total print cycle. Consequently, contacts PTMb remain closed during the total print cycle, permitting magnets SM of Acc. #1 to be energized, with the result that the accumulator is cleared. As explained previously, upon an intermediate group change, the machine goes through two successive total print cycles. During the first total print cycle, when contacts P15 open, magnet MI is deenergized and contacts MI5 open. Contacts CB28 also open shortly after. Magnet INT remains energized and contacts INT4b bridge the open period of contacts CB28. Hence magnet PT2 remains energized during the first total print cycle and until contacts CB28 open again at 216° of the second total print cycle. At that point, magnet PT2 is deenergized and contacts PT2b reopen but cam contacts CB35 being then closed, coil PT1 stays energized until 162° of the next cycle, when CB35 reopen. With coil PT1 remaining energized, a reconversion cycle occurs at the end of which the cleared accumulator will register 9999. This is the complement of 0000 and should a total be taken then, the zeros will be printed. Also, if further entries should be made, the result will be the same as adding or subtracting from a negative zero.

By setting dial switch PD to position 4, magnet PTM will be energized following each minor and intermediate group change to prevent clearing of the selected accumulator. Upon a major group change, contacts MA10 will open and magnet PTM will remain deenergized. Consequently, the selected accumulator will be zeroized as its total is printed.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In an accounting machine operating successively on value-bearing records arranged in groups, a denominational order accumulator for accumulating the values derived from each such group of records, entering means controlled by the records for entering values of one sign represented on the records in true figures in the accumulator and values of opposite sign represented on the records as complements, automatic control means for detecting a change in card group, means controlled by the automatic control means for testing the accumulator for the presence of a complement or true balance, elements rendered effective by the testing means upon detecting a complement balance, and conversion means including means coacting with the accumulator orders and said elements for controlling the entering means to enter conversion digits into the accumulator orders for converting the complement balance into true figures.

2. In a cyclically operating accounting machine through which records are fed in succession and which records are arranged in groups and each of which records may have a representation of a value of one sign or of opposite sign, a denominational order accumulator, analyzing means for the records, entering means controlled by the analyzing means for entering values of one sign represented on the records in true figures and represented values of opposite sign as complements into the accumulator, automatic control means for interrupting card feed upon a change in card group, means thereupon effective for testing the accumulator for presence of a complement or true balance, means controlled by the testing means upon detecting a complement balance for causing the machine to go through a conversion cycle, and means coacting during the conversion cycle with the accumulator orders for controlling the entering means to enter a predetermined conversion amount into the accumulator for converting the complement balance into true figures.

3. The machine as defined in claim 2, including means for reading out the balance from the accumulator during a readout cycle, means controlled by the automatic control means for enabling the machine to effect a readout cycle directly after interruption of card feed upon the testing means detecting a true balance in the accumulator, means controlled by the testing means upon detecting a complement balance for delaying the readout cycle and enabling the machine to effect said conversion cycle, and means effective after the conversion cycle for enabling the machine to effect the readout cycle during which the readout means reads out the true figures of the converted complement balance.

4. In combination, a denominational order accumulator, entering means for entering values in the accumulator, means for taking progressive totals standing in the accumulator, conversion means coacting, prior to a total taking operation, with the accumulator orders for controlling the entering means to enter predetermined conversion digits into the orders for converting a total standing in the accumulator into a corresponding complementary total, and means effective after the total has been taken for causing repeat operation of the conversion means to reconvert the complementary total in the accumulator into its previous total before further entries are made in the accumulator.

5. In combination, a denominational order accumulator, entering means for entering values of one sign in true figures and values of opposite sign as complements into the accumulator, means for detecting a complement balance in the accumulator, conversion means controlled by the detecting means and coacting with the accumulator orders for controlling the entering means to enter predetermined conversion figures into the accumulator to convert the complement balance into true figures, means operable after the conversion for taking a total of the converted balance in the accumulator while the accumulator after total taking retains the converted balance, and means operable after total taking for causing repeat operation of the conversion means to reconvert the converted balance in the accumulator into its previous complement balance.

6. In a cyclically operating accounting machine performing successive entry cycles and a readout cycle, said machine operating on a group of records bearing value designations, sensing means to sense the designations on the records during entry cycles, a denominational order accumulator, entering means controlled by the sensing means for entering complements of designated values of one sign on the records and true figures of designated values of opposite sign in the accumulator, automatic control means for detecting depletion of the group of records, means operating during the readout cycle for reading out an amount standing in the accumulator, means controlled by said automatic control means for automatically initiating the readout cycle directly following the last entry cycle relating to the group of records upon a true balance being present in the accumulator, means for detecting a complement balance in the accumulator, means controlled thereby for preventing said operation of the reading out means and initiating a further entry cycle, means effective during the conversion cycle for entering conversion values into the accumulator to convert the complement balance therein into corresponding true figures and means effective after the conversion operation for initiating the readout cycle so as to cause the true figures to be read out.

7. In a cyclically operating accounting machine for handling records bearing value designations, an accumulator having a plurality of register orders and carry means for denominationally relating the orders to receive value entries, entering means controlled by the records for entering nines complements of values of one sign and true figures of values of opposite sign designated on the records in the accumulator, record-controlled means for testing the accumulator for a nines complement balance or for a true balance, means controlled by the testing means upon detecting a nines complement balance for initiating a conversion cycle of the machine during which the carry means is ineffective and the orders, accordingly, dissociated, and conversion means operating during the conversion cycle under control of the dissociated orders and according to the digital value in each order for converting the registration in each order to a nines complement registration of the digital value previously registered therein, whereby the detected nines complement balance is converted to true figures.

8. In combination, a denominational order accumulator which may contain any of different amounts and including, in each accumulator order, coacting electrical parts relatively positioned according to the digit standing in the order, entering means for entering complements of variable values of one sign and true figures of variable values of opposite sign into the accumulator, and including an electrical device for each accumulator order and operation of which at differential times causes the entering means to enter values depending on the differential times, contact means differentially timed to correspond to predetermined conversion digits such as to complement to the true values different digits standing in the accumulator orders, means to detect a complemental balance in the accumulator, and circuits rendered effective by the detecting means and controlled at differential times by coaction of said contact means with the electrical parts of the different accumulator orders for operating the electrical device of each order to cause the entering means to enter therein that conversion digit that complements to the true value the digit standing therein, wherein the complemental balance in the accumulator is converted into a true balance.

9. In combination, denominationally ordered accumulator elements, carry means to effect carry from the accumulator element of one order to the accumulator element of another order, entering means to enter complements of values of one sign and true figures of values of opposite signs into the accumulator elements, means detecting a complement balance in the accumulator to initiate conversion operation during which the complement balance is converted to a true balance, means whereby the carry means is inactive during the conversion operation, conversion digit entry control means producing manifestations of different, predetermined conversion digits such as to complement different digits standing in the accumulator elements to their true values, and means rendered effective by the detecting means for selectively rendering said conversion digit entry control means effective, in accordance with the digit standing in each order of accumulator element, to control the entering means to enter into each accumulator element individually that conversion digit, selected by the digit standing in the accumulator element and required to complement the digit to the true value.

10. In an accounting machine operating successively on value-bearing records of a group which may consist of a variable number of such records; a denominational order accumulator for successively accumulating a variable number of values derived from the variable number of records in the group, entering means controlled by the records for entering the true figures of values of one sign, represented on the records, and the complements of values of opposite sign, represented on the records, into the accumulator, means to detect termination of the group of records, means controlled thereby for testing the accumulator for a complement kind of balance or a true kind of balance, elements rendered effective by the testing means upon detecting a balance of one kind, and conversion means comprising means rendering available predetermined conversion digit values and enabled by said elements to be effective under selective control of the accumulator orders, according to the digit values standing therein, for controlling the entering means to effect entries into the accumulator orders of those of the conversion digit values which complement the digit values standing in the accumulator orders to their complementary figures, whereby the detected balance of said one kind is converted into the complementary kind of balance.

11. In a cyclically operable machine having an accumulator provided with denominationally ordered accumulator elements and carry means to effect carry from one order element to another order element, said accumulator being constructed to algebraically totalize a variable number of successively entered positive or negative values and register either the complement of a negative total or the true figures of a positive total, said machine also having means for entering in each of a variable number of successive entry cycles a negative or positive value into the accumulator; the combination of means detecting such negative total complement in the accumulator to initiate conversion operation during a further entry cycle and by which operation the complement is to be converted to a true negative balance, means whereby the carry means is inactive during said further entry cycle, conversion digit entry control means rendering available predetermined conversion digit values such as to complement different digits standing in the accumulator elements to their true values, and means effective during said further entry cycle for enabling said conversion digit entry control means under selective control of the accumulator elements according to the digit values standing therein to control the entering means to enter into each accumulator element individually that conversion digit selected by the digit standing in the accumulator element and required to complement the digit to the true value.

12. In an accounting machine operating successively on value bearing records of a group which may consist of a variable number of such records and having a denominational order accumulator for successively accumulating a variable number of negative or positive values and having entering means controlled by the records for entering such values represented on the records into the accumulator, whereby the accumulator after the completion of entries from the group of records registers either the complement of a negative balance or the true figures of a positive balance; the combination with means to detect termination of the group of records, of means controlled thereby for testing the accumulator for the presence of the complement of a negative balance, elements rendered effective by the testing means upon detecting such complement, and conversion means comprising means rendering available predetermined conversion digit values and enabled by said elements to be effective under selected control of the accumulator orders according to the digit values standing therein for controlling the entering means to effect entries into the accumulator orders of those of the conversion digit values which complement the digit values standing in the accumulator orders to their complementary figures, whereby the complement of a negative balance is converted into the true figures of such balance.

DAVID W. RUBIDGE.
EDWARD J. RABENDA.